United States Patent
Houston

(10) Patent No.: US 8,818,901 B2
(45) Date of Patent: Aug. 26, 2014

(54) DIGITAL RIGHTS MANAGEMENT SYSTEMS AND METHODS FOR AUDIENCE MEASUREMENT

(75) Inventor: John Houston, New York, NY (US)

(73) Assignee: The Nielsen Company (US), LLC, Schaumburg, IL (US)

(*) Notice: Subject to any disclaimer, the term of this patent is extended or adjusted under 35 U.S.C. 154(b) by 605 days.

(21) Appl. No.: 12/564,657

(22) Filed: Sep. 22, 2009

(65) Prior Publication Data

US 2010/0228677 A1    Sep. 9, 2010

Related U.S. Application Data

(63) Continuation of application No. 11/968,991, filed on Jan. 3, 2008, now abandoned, which is a continuation of application No. PCT/US2007/069563, filed on May 23, 2007.

(60) Provisional application No. 60/810,745, filed on Jun. 2, 2006.

(51) Int. Cl.
 *G06Q 99/00* (2006.01)
 *G06Q 50/00* (2012.01)

(52) U.S. Cl.
 CPC ............ *G06Q 50/00* (2013.01); *G06Q 2220/18* (2013.01); *G06Q 2220/10* (2013.01)
 USPC .............................................. 705/59; 705/51

(58) Field of Classification Search
 USPC .................................................. 705/51, 59
 See application file for complete search history.

(56) References Cited

U.S. PATENT DOCUMENTS 2,856,993 A    10/1958  Juneau
4,858,000 A     8/1989  Lu
(Continued)

FOREIGN PATENT DOCUMENTS

CN    101466094    6/2009
EP    0275328      7/1988
(Continued)

OTHER PUBLICATIONS

Patent Cooperation Treaty, "International Search Report," issued by the International Searching Authority in connection with PCT application No. PCT/US2007/069563, mailed Sep. 29, 2008 (1 page).

(Continued)

*Primary Examiner* — James D Nigh
(74) *Attorney, Agent, or Firm* — Hanley, Flight & Zimmerman, LLC

(57) ABSTRACT

Digital rights management systems and methods for audience measurement are disclosed. An example method to monitor a media content presentation disclosed herein comprises configuring a media handler to present the media content presentation, automatically processing a measurement rights agreement with a digital rights manager to determine whether the measurement rights agreement authorizes monitoring of the media content presentation, when the digital rights manager determines that monitoring of the media content presentation is authorized, configuring the media handler to obtain measurement information corresponding to the media content presentation, and when the digital rights manager determines that monitoring of the media content presentation is not authorized, configuring the media handler to prevent measurement information corresponding to the media content presentation from being obtained, but not preventing the media handler from being configured to present the media content presentation.

25 Claims, 13 Drawing Sheets

(56) References Cited

U.S. PATENT DOCUMENTS

| | | | |
|---|---|---|---|
| 4,905,080 A | 2/1990 | Watanabe et al. |
| 4,930,011 A | 5/1990 | Kiewit |
| 5,373,315 A | 12/1994 | Dufresne et al. |
| 5,382,983 A | 1/1995 | Kwoh et al. |
| 5,394,461 A | 2/1995 | Garland |
| 5,444,769 A | 8/1995 | Koen et al. |
| 5,481,294 A | 1/1996 | Thomas et al. |
| 5,483,276 A | 1/1996 | Brooks et al. |
| 5,532,732 A | 7/1996 | Yuen et al. |
| 5,603,084 A | 2/1997 | Henry, Jr. et al. |
| 5,621,793 A | 4/1997 | Bednarek et al. |
| 5,629,739 A | 5/1997 | Dougherty |
| 5,629,980 A | 5/1997 | Stefik et al. |
| 5,678,170 A | 10/1997 | Grube et al. |
| 5,740,035 A | 4/1998 | Cohen et al. |
| 5,857,190 A | 1/1999 | Brown |
| 5,892,900 A | 4/1999 | Ginter et al. |
| 5,910,987 A | 6/1999 | Ginter et al. |
| 5,915,019 A | 6/1999 | Ginter et al. |
| 5,920,861 A | 7/1999 | Hall et al. |
| 5,943,422 A | 8/1999 | Van Wie et al. |
| 5,949,876 A | 9/1999 | Ginter et al. |
| 6,005,490 A | 12/1999 | Higashihara |
| 6,006,332 A | 12/1999 | Rabne et al. |
| 6,097,441 A | 8/2000 | Allport |
| 6,157,413 A | 12/2000 | Hanafee et al. |
| 6,226,618 B1 | 5/2001 | Downs et al. |
| 6,285,879 B1 | 9/2001 | Lechner et al. |
| 6,311,073 B1 | 10/2001 | Charpentier et al. |
| 6,327,573 B1 | 12/2001 | Walker et al. |
| 6,327,619 B1 | 12/2001 | Blumenau |
| 6,353,929 B1 | 3/2002 | Houston |
| 6,366,773 B1 | 4/2002 | Ihara et al. |
| 6,389,593 B1 | 5/2002 | Yamagishi |
| 6,393,300 B1 | 5/2002 | Doutheau et al. |
| 6,434,385 B1 | 8/2002 | Aucoeur |
| 6,434,614 B1 | 8/2002 | Blumenau |
| 6,467,089 B1 | 10/2002 | Aust et al. |
| 6,493,327 B1 | 12/2002 | Fingerhut |
| 6,516,189 B1 | 2/2003 | Frangione et al. |
| 6,577,713 B1 | 6/2003 | Peterson et al. |
| 6,622,116 B2 | 9/2003 | Skinner et al. |
| 6,714,778 B2 | 3/2004 | Nykanen et al. |
| 6,745,011 B1 | 6/2004 | Hendrickson et al. |
| 6,754,470 B2 | 6/2004 | Hendrickson et al. |
| 6,760,042 B2 | 7/2004 | Zetts |
| 6,839,680 B1 | 1/2005 | Liu et al. |
| 6,900,737 B1 | 5/2005 | Ardalan et al. |
| 6,939,233 B2 | 9/2005 | Emmerson |
| 6,948,073 B2 * | 9/2005 | England et al. ............. 726/32 |
| 6,970,698 B2 | 11/2005 | Majmundar et al. |
| 7,150,030 B1 | 12/2006 | Eldering et al. |
| 7,224,974 B2 | 5/2007 | Benco et al. |
| 7,343,317 B2 | 3/2008 | Jokinen et al. |
| 7,379,778 B2 | 5/2008 | Hayes et al. |
| 7,415,617 B2 | 8/2008 | Ginter et al. |
| 7,448,058 B2 * | 11/2008 | Heyner et al. ............... 725/9 |
| 7,502,367 B2 | 3/2009 | Becher et al. |
| 7,506,059 B2 | 3/2009 | Mulligan |
| 7,586,439 B2 | 9/2009 | Percy et al. |
| 7,587,473 B2 | 9/2009 | Benco et al. |
| 7,587,732 B2 | 9/2009 | Wright et al. |
| 7,680,889 B2 | 3/2010 | Blumenau et al. |
| 7,774,826 B1 * | 8/2010 | Romanek et al. ............ 726/3 |
| 7,849,154 B2 | 12/2010 | Grecco et al. |
| 7,860,883 B2 * | 12/2010 | Hinton et al. ............ 707/769 |
| 7,891,011 B1 * | 2/2011 | Thenthiruperai et al. ...... 726/30 |
| 7,894,703 B2 | 2/2011 | Lapstun et al. |
| 7,917,130 B1 | 3/2011 | Christensen et al. |
| 8,064,951 B2 | 11/2011 | Woodson et al. |
| 8,169,952 B2 | 5/2012 | Woodson et al. |
| 8,180,393 B2 | 5/2012 | Phillips et al. |
| 8,315,620 B1 | 11/2012 | Williamson et al. |
| 8,559,918 B2 | 10/2013 | Williamson et al. |
| 2001/0003828 A1 | 6/2001 | Peterson et al. |
| 2001/0037407 A1 | 11/2001 | Dragulev et al. |
| 2001/0052077 A1 | 12/2001 | Fung et al. |
| 2002/0019985 A1 | 2/2002 | Fuccello et al. |
| 2002/0029267 A1 | 3/2002 | Sankuratripati et al. |
| 2002/0033842 A1 | 3/2002 | Zetts |
| 2002/0056089 A1 | 5/2002 | Houston |
| 2002/0059218 A1 | 5/2002 | August et al. |
| 2002/0112048 A1 | 8/2002 | Gruyer et al. |
| 2002/0133393 A1 | 9/2002 | Tatsumi et al. |
| 2002/0143961 A1 | 10/2002 | Siegel et al. |
| 2002/0177429 A1 | 11/2002 | Watler et al. |
| 2003/0005430 A1 | 1/2003 | Kolessar |
| 2003/0014655 A1 * | 1/2003 | England et al. ............. 713/200 |
| 2003/0023336 A1 | 1/2003 | Kreidler et al. |
| 2003/0041125 A1 | 2/2003 | Salomon |
| 2003/0045301 A1 | 3/2003 | Wollrab |
| 2003/0065777 A1 | 4/2003 | Mattila et al. |
| 2003/0066070 A1 * | 4/2003 | Houston ...................... 725/9 |
| 2003/0067554 A1 | 4/2003 | Klarfeld et al. |
| 2003/0074400 A1 | 4/2003 | Brooks et al. |
| 2003/0093311 A1 | 5/2003 | Knowlson |
| 2003/0115586 A1 | 6/2003 | Lejouan et al. |
| 2003/0170001 A1 | 9/2003 | Breen |
| 2003/0171833 A1 | 9/2003 | Crystal et al. |
| 2003/0177488 A1 | 9/2003 | Smith et al. |
| 2003/0200313 A1 | 10/2003 | Peterka et al. |
| 2003/0233336 A1 | 12/2003 | Clark |
| 2003/0233461 A1 | 12/2003 | Mariblanca-Nieves et al. |
| 2004/0039814 A1 | 2/2004 | Crabtree et al. |
| 2004/0068502 A1 | 4/2004 | Vogedes et al. |
| 2004/0103142 A1 | 5/2004 | Becher et al. |
| 2004/0103143 A1 | 5/2004 | Chikada et al. |
| 2004/0111738 A1 | 6/2004 | Gunzinger |
| 2004/0117490 A1 | 6/2004 | Peterka et al. |
| 2004/0117857 A1 | 6/2004 | Bisdikian et al. |
| 2004/0181818 A1 * | 9/2004 | Heyner et al. ............. 725/146 |
| 2004/0186882 A1 | 9/2004 | Ting |
| 2004/0198234 A1 | 10/2004 | Wacker et al. |
| 2005/0004873 A1 * | 1/2005 | Pou et al. ................... 705/51 |
| 2005/0060584 A1 | 3/2005 | Ginter et al. |
| 2005/0148335 A1 | 7/2005 | Benco et al. |
| 2005/0204379 A1 | 9/2005 | Yamamori |
| 2005/0213511 A1 | 9/2005 | Reece, Jr. et al. |
| 2005/0213544 A1 | 9/2005 | Kikuchi et al. |
| 2005/0246282 A1 * | 11/2005 | Naslund et al. .............. 705/52 |
| 2005/0251408 A1 * | 11/2005 | Swaminathan et al. .......... 705/1 |
| 2006/0075111 A1 | 4/2006 | Auryan et al. |
| 2006/0167971 A1 | 7/2006 | Breiner |
| 2006/0168250 A1 | 7/2006 | Feng et al. |
| 2006/0173974 A1 | 8/2006 | Tang |
| 2006/0277271 A1 | 12/2006 | Morse et al. |
| 2006/0277308 A1 | 12/2006 | Morse et al. |
| 2006/0294225 A1 | 12/2006 | Grecco et al. |
| 2007/0006250 A1 | 1/2007 | Croy et al. |
| 2007/0055987 A1 | 3/2007 | Lu et al. |
| 2007/0073799 A1 | 3/2007 | Adjali et al. |
| 2007/0185986 A1 | 8/2007 | Griffin et al. |
| 2007/0192438 A1 * | 8/2007 | Goei ...................... 709/219 |
| 2007/0192486 A1 | 8/2007 | Wilson et al. |
| 2007/0203791 A1 | 8/2007 | Kohl et al. |
| 2007/0282959 A1 | 12/2007 | Stern |
| 2008/0010133 A1 | 1/2008 | Pyhalammi et al. |
| 2008/0010288 A1 * | 1/2008 | Hinton et al. ............... 707/10 |
| 2008/0021741 A1 | 1/2008 | Holla et al. |
| 2008/0022294 A1 | 1/2008 | Perrin et al. |
| 2008/0091489 A1 | 4/2008 | LaRock et al. |
| 2008/0102884 A1 | 5/2008 | Song et al. |
| 2008/0142599 A1 | 6/2008 | Benillouche et al. |
| 2008/0287142 A1 * | 11/2008 | Keighran ................ 455/456.5 |
| 2009/0030066 A1 | 1/2009 | Kiss |
| 2009/0305680 A1 | 12/2009 | Swift et al. |

FOREIGN PATENT DOCUMENTS

| | | |
|---|---|---|
| EP | 0425347 | 5/1991 |
| EP | 0683451 | 11/1995 |
| EP | 0697773 | 2/1996 |
| EP | 0713335 | 5/1996 |
| EP | 1026847 | 8/2000 |

(56) References Cited

FOREIGN PATENT DOCUMENTS

| EP | 1213860 | 6/2002 |
|---|---|---|
| EP | 1453286 | 9/2004 |
| GB | 2455965 | 6/2009 |
| JP | 2000307530 | 11/2000 |
| JP | 2002051274 | 2/2002 |
| JP | 2004274727 | 9/2004 |
| WO | 9810539 | 3/1998 |
| WO | 0245273 | 6/2002 |
| WO | 02093811 A2 | 11/2002 |
| WO | 2005038625 | 4/2005 |
| WO | 2006135205 | 12/2006 |
| WO | 2010006914 A1 | 1/2010 |

OTHER PUBLICATIONS

Patent Cooperation Treaty, "Written Opinion," issued by the International Searching Authority in connection with PCT application No. PCT/US2007/069563, mailed Sep. 29, 2008 (3 pages).

Patent Cooperation Treaty, "International Preliminary Report on Patentability," issued by the International Bureau of WIPO in connection with counterpart PCT application No. PCT/US2007/069563, mailed Dec. 3, 2008 (4 pages).

United States Patent and Trademark Office, "Notice of Panel Decision from Pre-Appeal Brief Review," issued in connection with U.S. Appl. No. 11/968,991, filed Aug. 20, 2009 (2 pages).

United States Patent and Trademark Office, "Final Office Action," issued in connection with U.S. Appl. No. 11/968,991, filed Nov. 25, 2008 (20 pages).

United States Patent and Trademark Office, "Non-Final Office Action," issued in connection with U.S. Appl. No. 11/968,991, filed Jun. 4, 2008 (10 pages).

Australian Patent Office, "Patent Examination Report No. 1," issued in Australian Application No. 2012202759 on Apr. 11, 2013 (6 pages).

The State Intellectual Property Office of China, "First Notification of Office Action," in consideration of Application No. 201210167233.1, issued Dec. 10, 2013 (14 pages).

The State Intellectual Property Office of China, "Search Report," in consideration of Application No. 201210167233.1, issued Dec. 10, 2013 (2 pages).

European Patent Office, "Extended European Search Report," issued in European Application No. 12004034.0 on Sep. 10, 2012 (7 pages).

Japanese Patent Office "Notice of Reasons for Rejection," issued in connection with JP Patent Application No. P2012-118835, mailed Jun. 11, 2013 (4 pages).

Japanese Patent Office "Notice of Final Rejection," issued in connection with JP Patent Application No. P2012-118835, mailed Mar. 4, 2014 (1 page).

United States Patent and Trademark Office, "Notice of Allowance," in connection with U.S. Appl. No. 13/117,657, mailed Jul. 13, 2012 (22 pages).

United States Patent and Trademark Office, "Non-Final Office Action," issued in connection with U.S. Appl. No. 13/678,960, mailed Feb. 28, 2013 (19 pages).

United States Patent and Trademark Office, "Notice of Allowance," in connection with Application No. 13/678,960, mailed Jun. 10, 2013 (19 pages).

Kazaa, Product Bulletin, retrieved from www.kazaa.com, as viewed through www.archive.org, on Jun. 18, 2001 (1 page).

\* cited by examiner

DIGITAL RIGHTS MANAGEMENT SYSTEMS AND METHODS FOR AUDIENCE MEASUREMENT

RELATED APPLICATIONS

This patent is a continuation of U.S. patent application Ser. No. 11/968,991, entitled "Digital Rights Management Systems and Methods for Audience Measurement" and filed on Jan. 3, 2008, which is a continuation of International Application Serial Number PCT/US07/069,563, entitled "Digital Rights Management Systems and Methods for Audience Measurement" and filed on May 23, 2007, which claims priority from U.S. Provisional Application Ser. No. 60/810,745, entitled "Digital Rights Management Systems and Methods for Audience Measurement" and filed on Jun. 2, 2006. U.S. patent application Ser. No. 11/968,991, International Application Serial Number PCT/US07/069,563 and U.S. Provisional Application Ser. No. 60/810,745 are hereby incorporated by reference in their respective entireties.

FIELD OF THE DISCLOSURE

This disclosure relates generally to audience measurement, and, more particularly, to digital rights management systems and methods for audience measurement.

BACKGROUND

Knowledge concerning audience consumption of media content allows content providers to tailor content to a specific audience and enables advertisers to target the specific audience likely to view a particular type of media content. Audience measurement information, such as media content ratings and/or other metering information, is typically generated by collecting tuning records and/or other exposure information from a group of statistically selected households. In many situations, a statistically selected household is provided a data logging and processing unit, referred to herein as a "home unit," which measures media content exposure for the household.

In a typical procedure for installing the home unit in a particular household, the household is first selected for recruitment and invited to participate in an audience measurement panel. If the household agrees to participate, a representative of a media measurement entity, such as an interviewer, visits the household to explain the requirements for participating in the audience measurement panel. If the household agrees to these requirements, an agreement is executed between the panel members of the household and the media measurement entity. The media measurement entity then arranges to install the home unit in the household, possibly through a subsequent visit by a field technician. Upon termination of the household's participation in the panel, a representative of the media measurement entity, such as another field technician, returns to remove the meter from the household.

Many modern media devices, such as set-top boxes, personal computers, etc., employ one or more media handlers (e.g., such as Microsoft Corporation's Windows Media Player, RealNetworks's RealPlayer, etc.) to process media content into a form suitable for presentation by an output device. Additionally, many modern media devices also include digital rights management technology to enable a device user to access protected media content. In particular, a conventional digital rights management client is capable of processing rules included in a license agreement associated with the protected content to determine whether a media handler is allowed to access and present the protected content.

DETAILED DESCRIPTION

Figure 1:
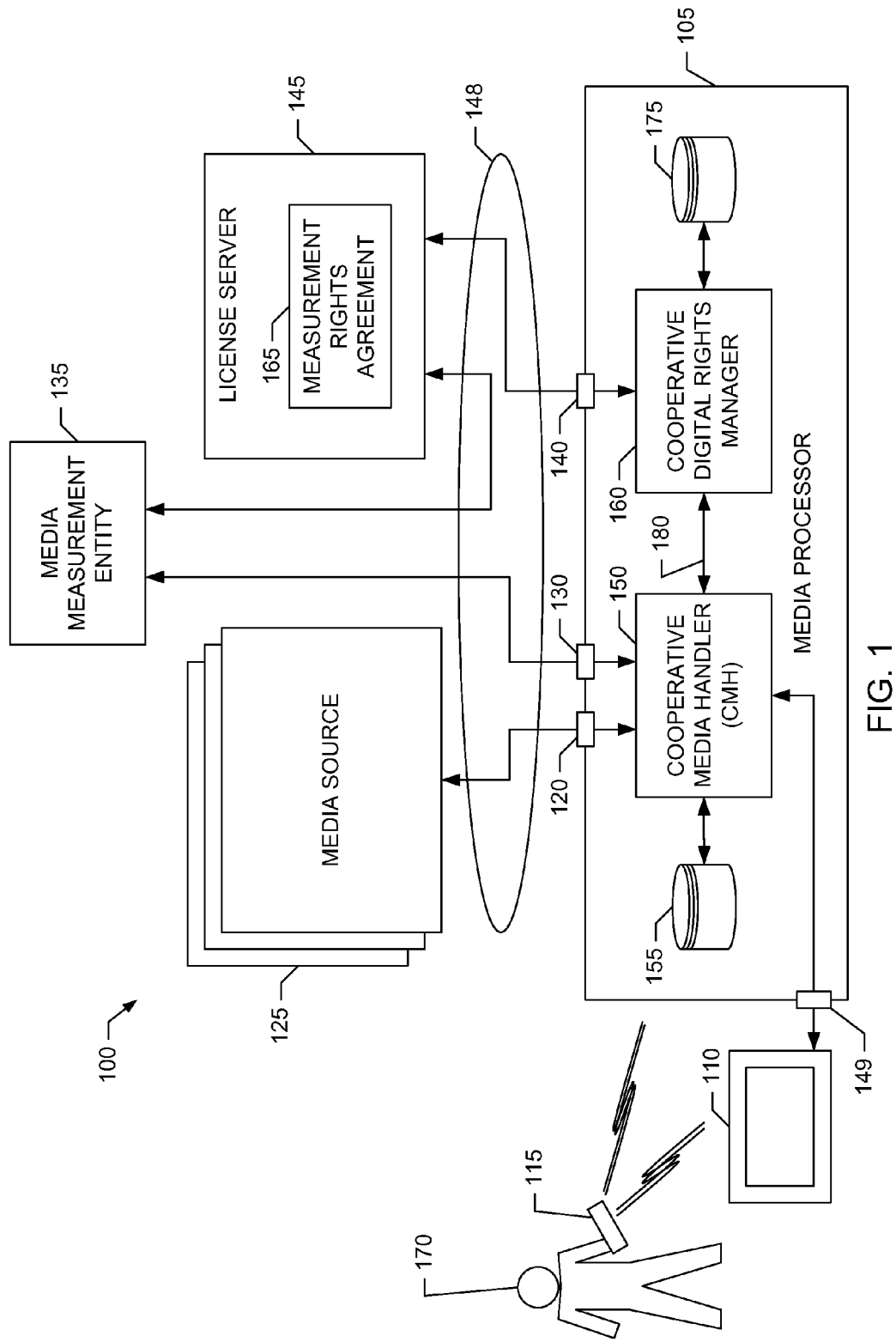
FIG. 1 is a block diagram of an example media presentation and measurement system.

A block diagram of an example media presentation and measurement system 100 capable of presenting audio and/or video content and measuring audience consumption of the presented content is shown in FIG. 1. The example media presentation and measurement system 100 supports the audience measurement techniques disclosed herein, including preparing a measurement rights agreement between a media measurement entity and an audience member, processing the measurement rights agreement with a cooperative digital rights manager to determine whether the measurement rights agreement authorizes a media measurement entity to measure an audience member's consumption of media content, and enabling a cooperative media handler to obtain information related to the consumption of media content in accordance with the terms of the measurement rights agreement.

The example media presentation and measurement system 100 allows a media measurement entity that endeavors to measure a consumer's consumption of media content to: (1) recognize the right of a consumer of media to control the measurement of the consumer's media usage; (2) establish business models to allow the consumer to enter into an agreement to license measurement of the consumer's media usage; (3) optionally provide consideration (e.g., a monetary payment or payment in kind, such as a coupon, a gift card, etc.) from the media measurement entity and/or another party to induce a consumer to accept the measurement rights agreement; and (4) utilize digital rights management technology to administer the measurement rights agreement. Furthermore, the example media presentation and measurement system 100 allows the media measurement entity to achieve any or all of the following objectives, including: (1) increasing participation in audience measurement panels by potential panelists through automated and open measurement rights agreements, (2) reducing the amount of additional software and hardware needed at a panelist's site to enable audience measurement, (3) providing non-invasive techniques for audience measurement (e.g., by requiring little to no action on the part of audience members to perform the audience measurement), (4) reducing audience measurement costs (e.g., by reducing costs to install and support metering equipment and/or software), (5) reducing the need to bypass potential panelists because their sites may be technically difficult to monitor, (6) simplifying the removal of panelists from audience measurement panels and/or (7) addressing the privacy concerns of panelists.

Turning more specifically to the example of FIG. 1, the example media presentation and measurement system 100 includes a media processor 105, a display device 110 and a remote control device 115 for controlling the operation of the media processor 105 and/or the display device 110. The example media processor 105 includes one or more ports 120 to provide access to media content (e.g., such as audio and/or video content) from any number of media content sources 125 for possible presentation via the display device 110. The example media processor 105 also includes one or more ports 130 to provide a media measurement entity 135 with access to the media processor 105 for possible measurement of media content processed by the media processor 105 and/or downloading of software for performing such measurements. Additionally, the example media processor 105 also includes one or more ports 140 to provide access to a license server 145 associated with the media measurement entity 135 to control whether audience measurement of the media processor 105 by the media measurement entity 135 is permitted. The components of the example media presentation and measurement system 100 may be connected in any well-known manner, including that shown in FIG. 1. Also, persons having ordinary skill in the art will appreciate that any or all of the ports 120, 130 and/or 140 may be implemented as separate ports based on, for example, the different interfaces required to implement the respective communication paths. Additionally or alternatively, persons having ordinary skill in the art will recognize that some or all of the ports 120, 130 and/or 140 may be implemented by a single port if they use a common communication interface, such as the communication network 148 (e.g., such as the Internet).

The example media processor 105 may be any type of media processor, such as, for example, a computing device (e.g., a personal computer (PC), a personal digital assistant (PDA), a mobile phone, an MP3 player such as an iPod, etc.) executing one or more software applications capable of presenting audio and/or video content. Additionally or alternatively, example media processor 105 may be any type of set-top box (STB) capable of accessing remote content, such as, for example, a cable television converter, a direct broadcast satellite (DBS) decoder, a terrestrial digital television (DTV) receiver, a VCR, a digital video recorder such as a personal video recorder, etc., and/or capable of accessing local content, such as, for example, a digital versatile disk (DVD) player, a VCR, etc. The example media processor 105 may also be any type of game console or other gaming device.

The display device 110 is coupled to the media processor 105 via a suitable port 149 and may be any type of display device, such as a computer monitor, an LCD display, a television display, etc. For example, the display device 110 may support the National Television Standards Committee (NTSC) standard, the Phase Alternating Line (PAL) standard, the Systeme Électronique pour Couleur avec Mémoire (SECAM) standard, a standard developed by the Advanced Television Systems Committee (ATSC), such as high definition television (HDTV), a standard developed by the Digital Video Broadcasting (DVB) Project, a multimedia computer system, etc. Additionally or alternatively, the display device 110 could incorporate any type of audio presentation device, such as, for example, speakers, headphones, etc.

The remote control device 115 may be any type of remote control device, such as, for example, a wireless (e.g., such as RF, infrared, etc.) remote control for a television, STB, etc., a wireless game controller for a video game console, or a wireless input device for a computing device, such as, for example, a wireless keyboard, mouse, stylus, etc. Additionally or alternatively, the remote control device 115 may be a wired control device, e.g., such as a wired keypad, keyboard, mouse, stylus, a wired game controller for a video game console, etc. The remote control device 115 may be configured to control one or more operations of the display device 110, such as, for example, channel selection, volume control, ON/OFF control, etc. Additionally or alternatively, the remote control device 115 may be configured to control one or more operations of the media processor 105, such as, for example, selection of media content to be presented by a cooperative media handler 150 included in the media processor 105, control of one or more trick modes of the cooperative media handler 150 (e.g., such as fast forward, rewind, pause, etc.), requesting access to protected media content, etc.

The one or more media sources 125 may correspond to any type of media content sources and/or providers. For example, a media source 125 may correspond to a media content server accessible via, for example, the Internet. Such a media content server may provide streaming audio and/or video content, audio and/or video content for download, etc. Additionally or alternatively, another media content source 125 may correspond to a broadcast media source, such as, for example, a cable television service provider, a satellite television service provider, a terrestrial television service provider, a broadcast radio provider, a satellite radio provider, a cellular phone television provider, etc.

The media measurement entity 135 may correspond to an entity entirely independent from the one or more media sources 125, which is interested in measuring the consumption of content from some or all of the media sources 125. Alternatively, the media measurement entity 135 may correspond to one or more of the media sources 125 which is interested in measuring the consumption of content.

Media content provided by the one or more media sources 125 to the media processor 105 is processed by a cooperative media handler 150 for presentation by the display device 110. The cooperative media handler 150 may be implemented by any type of media handler, such as, for example, a media handler operating on a computer (e.g., Microsoft Corporation's Windows Media Player, RealNetworks's RealPlayer, etc.), a dedicated software application or module to decode and convert a particular type of data to a format suitable for presentation (e.g., a software module operating in a digital STB), etc. For example, the cooperative media handler 150 may include persistent software components which extend the capabilities of a software application and/or operating system to present media objects of a particular media type. Additionally or alternatively, the cooperative media handler 150 may include autonomous software components, such as Java applets, which may only temporarily extend the capabilities of a host device (e.g., such as the media processor 105) to present media content. The cooperative media handler 150 may also include, for example, software applications that generate media experiences in real-time, such as video games, and resident software components, such as the PointCast agent, which present media content to end users. In some example implementations, the cooperative media handler 150 includes those portions of an Internet browser, such as "viewers" and/or "plug-ins," that are capable and responsible for decoding specific media types, such as JPEG images, MPEG movies, etc., and using the resources of the host device (e.g., such as the media processor 105) to present the media content. Additionally or alternatively, in some example implementation the cooperative media handler 150 may be instantiated/implemented as one or more rich Internet applications (RIAs) wherein a portion of the media processing is performed on the host device (e.g., such as the media processor 105) and another portion of the media processing is performed on a server (e.g., such as a server associated with a media content source 125). Depending on the application, the cooperative media handler 150 may be mobile (e.g., capable of moving from one host device to another) or stable (e.g., anchored to one host device).

In addition to processing media content for presentation, the cooperative media handler 150 may be configured to operate in a "cooperative mode" and collect measurement information associated with the media content to be presented. For example, the cooperative media handler 150 may include software metering functionality capable of processing information (e.g., such as identification tags, metadata, etc.) embedded in the media content to be presented. Additionally or alternatively, the cooperative media handler 150 may include software metering functionality capable of capturing user commands input to the media processor 105 and/or the cooperative media handler 150 to control the presentation of the media content. The collected measurement information may be stored in a storage unit 155 (e.g., such as one or more known memory devices) disposed in and/or communicatively coupled to the media processor 105. The cooperative media handler 150 then transmits the stored measurement information to the media measurement entity 135 via the one or more ports 130. An example cooperative media handler that may be used to implement the example cooperative media handler 150 is described in U.S. Pat. No. 6,353,929, which is incorporated herein by reference in its entirety.

For security and privacy reasons, a cooperative media handler manufacturer may distribute the example cooperative media handler 150 in a default configuration in which measurement of media content is disabled (i.e., in a "non-cooperative mode"). Furthermore, the example cooperative media handler 150 is switchable between a cooperative mode (i.e., measurement enabled) and a non-cooperative mode (i.e., measurement disabled) during its operation based on, for example, whether a particular audience member has authorized measurement of media content presented by the media processor 105. Additionally, the scope of measurement information to be collected in the cooperative mode may be restricted based on, for example, a measurement rights agreement associated with the audience member. The cooperative digital rights manager (DRM) 160 of the illustrated example provides the ability to remotely and securely activate and/or restrict the cooperative mode of the cooperative media handler 150 based on a measurement rights agreement 165 executed between the media measurement entity 135 and the audience member 170 whose consumption of media content is to be measured.

Conventional digital rights management clients (called conventional DRMs herein) are currently deployed with conventional media handlers (e.g., Microsoft Corporation's Windows Media Player 10) and/or may be included as operating system components (e.g., as a component in Microsoft's Vista operating system) to enable a user to access protected media content. Using a conventional DRM, a content owner may make media content available to media consumers only under specified terms and conditions, (e.g., such as a limited duration rental). In such circumstances, the content owner protects the media content by using encryption to encapsulate it in a secure wrapper. The consumer then selects the protected media content for presentation using any appropriate technique (e.g., via a media handler menu/input selection, via accessing a link in an Internet browser, etc.). The protected content, a key protecting the content and an encrypted license agreement containing the business rules associated with the protected content are then provided to the consumer. The conventional DRM securely stores the key and the license agreement. The protected content may also be stored on the consumer's media processor (e.g., the media processor 105). When the media consumer seeks to access the protected content, the conventional DRM retrieves the associated license agreement and key, if available, from the conventional DRM's secure storage area. The conventional DRM then unlocks the associated license agreement with the key and interprets the business rules contained in the license agreement. If allowed by the business rules, the conventional DRM decrypts the protected content and provides the content to the media handler. The media handler then decodes and presents the media to the media consumer, for example, via a display device (e.g., such as the display device 110).

The cooperative DRM 160 of FIG. 1 includes the access control functionality of a conventional DRM client discussed above. Additionally, the cooperative DRM 160 is configured to manage measurement rights for the media processor 105 (e.g., as agreed to by the audience member 170). More specifically, the cooperative DRM 160 is capable of enabling and disabling a cooperative mode of the cooperative media handler 150, and/or restricting measurement functionality when the cooperative media handler 150 is in the cooperative mode. For example, the cooperative DRM 160 may interpret one or more business rules included in the measurement rights agreement 165 in a manner similar to the interpreting of a conventional license agreement for protected content. Then, based on the results of interpreting the business rules contained in the measurement rights agreement 165, the cooperative DRM 160 may enable measurement by configuring the cooperative media handler 150 to operate in a cooperative mode, disable measurement by configuring the cooperative media handler 150 to operate in a non-cooperative mode, restrict the information that may be collected by the cooperative media handler 150 in the cooperative mode, etc. Of course, the cooperative DRM 160 may also interpret the business rules contained in a content license agreement to determine whether the audience member 170 may access protected media content irrespective of whether any such access is measured.

To further illustrate the operation of the cooperative DRM 160, consider an example scenario in which the audience member 170 enters into an agreement with the media measurement entity 135 to have his or her consumption of media content measured. The measurement rights agreement 165 embodies the terms of this agreement. Then, in addition to processing license agreements to allow the audience member 170 to access protected content provided by one or more of the media sources 125, the cooperative DRM 160 is also configured to obtain and interpret the measurement rights agreement 165 to determine whether the cooperative media handler 150 may measure information corresponding to the consumption of media content by the audience member 170. The cooperative DRM 160 may be configured to obtain the measurement rights agreement 165 from the license server 145 associated with the media measurement entity 135, for example, when the cooperative media handler 150 and/or the cooperative DRM 160 are first activated, when the audience member 170 accesses protected or unprotected content via the media processor 105 from one or more of the media sources 125, and/or at predetermined time intervals, etc. Furthermore, the cooperative DRM 160 may be configured to store the measurement rights agreement 165 locally in a storage unit 175 (e.g., one or more known memory devices). Then, after obtaining the measurement rights agreement 165 from the license server 145 or storage unit 175, the cooperative DRM 160 interprets the business rules included in the measurement rights agreement 165 to determine whether to configure the cooperative media handler 150 in a cooperative mode or a non-cooperative mode, and/or whether to restrict the measurement information collected by the cooperative media handler 150 while in the cooperative mode.

A conventional protected content license agreement is typically associated with a particular piece of media content and governs the relationship between the media consumer and the content owner of the particular protected media content. In contrast, the measurement rights agreement is typically associated with an individual and the scope of the measurement rights agreement typically spans the measurement of all media content presented by the media processor 105 for the audience member 170. Furthermore, the scope of the measurement rights agreement may span measurement of media content presented by a plurality of media processors 105 used by the audience member 170. An example measurement rights agreement 165 may include any or all of the following business rules:

(1) the name of the media measurement entity 135,
(2) contact information for the media measurement entity 135,
(3) the name of the audience member 170,
(4) a globally unique identifier for the audience member 170,
(5) terms for the audience member 170 to revoke the measurement rights agreement 165,
(6) terms for the audience member 170 to audit his or her personal information,
(7) the duration of the measurement rights agreement 165,
(8) the jurisdiction of the measurement rights agreement 165,
(9) a description of the scope of media content to be measured (e.g., such as a description of the type of content, products and/or services measured and/or excluded from measurement, etc.).
(10) a description of the household scope to be measured (e.g., such as which individuals in the household are to be monitored, etc.),
(11) terms regarding the permitted uses of collected information by the media measurement entity 135,
(12) terms regarding the permitted uses of collected information by the audience member 170,
(13) a description of valuable consideration (of monetary or non-monetary value) to be provided by the media measurement entity 135 to the audience member 170,
(14) dispute resolution provisions, and/or
(15) confidentiality provisions, including, for example, terms regarding the permitted disclosure of collected information by the media measurement entity 135 and/or the audience member 170.

Other business rules may additionally or alternatively be included.

Persons having ordinary skill in the art will appreciate that the cooperative DRM 160 may be integrated into the cooperative media handler 150. Alternatively, persons having ordinary skill in the art will recognize that the cooperative DRM 160 may be implemented external to the cooperative media handler 150. In the latter implementation, a secure path 180 may be provided between the cooperative DRM 160 and the cooperative media handler 150. The secure path 180 reduces the likelihood of a hostile application spoofing the cooperative media handler 150 and activating cooperation in a manner to which the audience member 170 is unaware and has not agreed.

Persons having ordinary skill in the art will also appreciate that the cooperative DRM 160 may be implemented as software and/or hardware in the media processor 105. The cooperative DRM 160 may also be downloaded as a software module to the media processor 105 and/or provided as a software update to modify a conventional DRM in the media processor 105 into a cooperative DRM. Such software modules and/or software updates may be downloaded to the media processor 105 by a network connection, such as the communication network 148, the Internet, a telecommunications network, etc.

Figure 2:
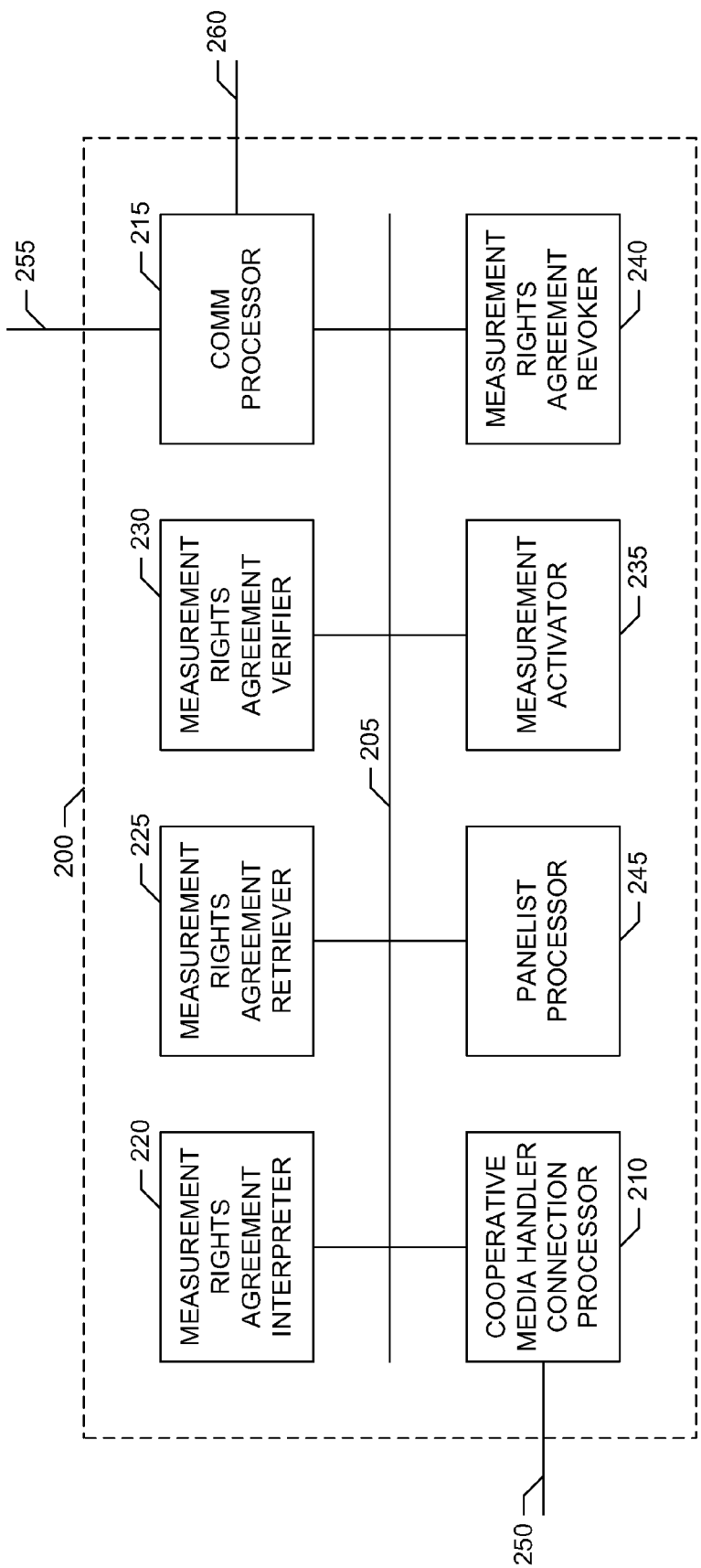
FIG. 2 is a block diagram of an example cooperative digital rights manager that may be used to implement the example media presentation and measurement system of FIG. 1.

A block diagram of an example cooperative DRM 200 that may be used to implement the cooperative DRM 160 of FIG. 1 is illustrated in FIG. 2. This example cooperative DRM 200 is able to interface with an associated, compatible cooperative media handler (e.g., such as the cooperative media handler 150) and interpret a measurement rights agreement (e.g., such as the measurement rights agreement 165). The example cooperative DRM 200 includes a communication bus 205 that enables communication between a variety of components disposed in or otherwise communicatively coupled to the cooperative DRM 200, such as, for example, any or all of a cooperative media handler connection processor 210, a communication processor 215, a measurement rights agreement interpreter 220, a measurement rights agreement retriever 225, a measurement rights agreement verifier 230, a measurement activator 235, a measurement rights revoker 240 and/or a panelist processor 245. Persons of ordinary skill in the art will appreciate that the communication bus 205 may be implemented by any type of communication bus, switching interconnect, dedicated link(s), etc.

The cooperative media handler connection processor 210 is included in the cooperative DRM 200 to process communications between the cooperative DRM 200 and a cooperative media handler (e.g., the cooperative media handler 150 of FIG. 1) occurring over an interface 250. For example, the cooperative media handler connection processor 210 may be configured to send commands to, for example: (1) place the cooperative media handler 150 in a cooperative mode to enable collection of measurement information, (2) place the cooperative media handler 150 in a non-cooperative mode to disable collection of measurement information, and/or (3) restrict the type of measurement information that may be collected when the cooperative media handler 150 is in the cooperative mode. Additionally or alternatively, the cooperative media handler connection processor 210 may be configured to enable the cooperative DRM 200 (and/or, one or more of the components of the cooperative DRM 200) to access a whitelist maintained by the cooperative media handler 150. The whitelist is a list identifying trusted media measurement entities (e.g., such as the media measurement entity 135) and/or license servers (e.g., such as the license server 145) associated with one or more measurement rights agreements to be processed by the cooperative DRM 200.

The communication processor 215 is included in the cooperative DRM 200 to support communication via an interface 255 between the cooperative DRM 200 and, for example, one or more media measurement entities, such as the media measurement entity 135, and/or one or more associated license servers, such as the license server 145. The interface 255 may be any type of communication interface, such as, for example, an interface to a computer network (e.g., the Internet), an interface to a transmitter (e.g., a cellular telephone transmitter) to relay data to a receiving device, etc. Additionally or alternatively, the communication processor 215 supports communication with a storage unit (e.g., the storage unit 175) via an appropriate interface 260 and/or the communication bus 205.

To prepare a measurement rights agreement, for example, such as the measurement rights agreement 165 between the media measurement entity 135 and the audience member (also known as a panelist) 170, the example cooperative DRM 200 includes the measurement rights agreement interpreter 220. The measurement rights agreement interpreter 220 may be configured to permit review, modification and/or acceptance of business rules (terms) included in an initial measurement rights agreement 165 provided by the media measurement entity 135 to the audience member 170. For example, if the cooperative DRM 200 (e.g., through the measurement rights agreement retriever 225) determines that there is no existing media rights agreement 165, the measurement rights agreement interpreter 220 may request that the media measurement entity 135 provide access to a default measurement rights agreement 165 stored on the license server 145 via the communication processor 215 and interface 255. The measurement rights agreement interpreter 220 may then allow the audience member 170 to accept or reject the default measurement rights agreement 165 and report this decision back to the license server 145 and/or the media measurement entity 135. The measurement rights agreement interpreter 220 may also allow the audience member 170 to modify the default measurement rights agreement 165, in which case the modified measurement rights agreement 165 is returned to the license server 145 and/or the media measurement entity 135 for consideration. If the audience member 170 and the media measurement entity 135 agree to the default and/or modified measurement rights agreement 165, the measurement rights agreement interpreter 220 may be further configured to permit either or both entities to electronically sign the agreement to indicate assent to the terms.

To retrieve the prepared measurement rights agreement 165, the example cooperative DRM 200 invokes the measurement rights agreement retriever 225. The measurement rights agreement retriever 225 of the illustrated example is configured to attempt to obtain an existing measurement rights agreement 165 upon any or all of the following conditions or combinations thereof: (1) activation of the cooperative DRM 200, (2) activation of the associated cooperative media handler 150, and/or (3) selection by the audience member 170 of media content for presentation. The measurement rights agreement retriever 225 of the illustrated example is also configured to first attempt to obtain the existing measurement rights agreement 165 from a local storage unit (e.g., such as the storage unit 175) via the communication processor 215 and interface 260. If the measurement rights agreement 165 is not in local storage, the measurement rights agreement retriever 225 of the illustrated example is configured to next attempt to obtain the existing measurement rights agreement 165 from the license server 145 associated with the appropriate media measurement entity 135. In this latter case, the measurement rights agreement retriever 225 accesses the license server 145 via the communication processor 215 and interface 255 to obtain the existing measurement rights agreement 165 and then stores the agreement in the local storage unit via the communication processor 215 and interface 260.

The illustrated example cooperative DRM 200 also includes the measurement rights agreement verifier 230 configured to verify the existing measurement rights agreement 165 obtained by the measurement rights retriever 225. The measurement rights agreement verifier 230 of the illustrated example determines whether the measurement rights agreement 165 is valid and not corrupted (e.g., by comparing CRC values, checksums, electronic signatures, encryption information, business rule values, etc.). Additionally, the measurement rights agreement verifier 230 of the illustrated example determines whether a predetermined time period has elapsed requiring updating of the measurement rights agreement 165.

To activate measurements based on a measurement rights agreement verified by the measurement rights agreement verifier 230, the example cooperative DRM 200 includes the measurement activator 235. The measurement activator 235 of the illustrated example determines whether an associated cooperative media handler 150 should be placed in a cooperative mode or a non-cooperative mode based on the retrieved measurement rights agreement 165. Additionally, the measurement activator 235 of the illustrated example processes the business rules (terms) contained in the measurement rights agreement 165 to determine, for example, whether restrictions should be placed on the type of measurement information to be collected (e.g., such as restrictions based on content source, type of media content, name of panelist, etc.). Such determinations are then used to control the measurement functionality of the cooperative media handler 150 via the cooperative media handler connection processor 210 and the interface 250.

The cooperative DRM 200 of the illustrated example also includes the measurement rights agreement revoker 240 which is configured to revoke an existing measurement rights agreement 165 between the media measurement entity 135 and the audience member 170 upon the occurrence of certain circumstances. The measurement rights agreement revoker 240 may determine that revocation is warranted if, for example, the media measurement entity 135 decides to exclude the audience member 170 from an audience measurement panel, the audience member 170 decides to opt out of the audience measurement panel, a predetermined time interval for updating the measurement rights agreement 165 elapses, etc. Upon determining revocation is warranted, the measurement rights agreement revoker 240 of the illustrated example signals the license server 145 and/or the associated media measurement entity 135 via the communication processor 215 and interface 255 that the measurement rights agreement 165 for the audience member 170 should be revoked and deleted from the license server 145. The measurement rights agreement revoker 240 would also delete any local copy of the measurement rights agreement 165 from local storage.

The example cooperative DRM 200 further includes the panelist processor 245 to process input commands and/or information provided by the audience member 245. Such input commands and/or information may include any or all of: (1) decisions to accept and/or reject a measurement rights agreement 165, (2) a decision to modify the measurement rights agreement 165 along with the modification information, (3) electronic signature information, (4) a decision to opt out of an audience measurement panel, etc.

Flowcharts representative of example procedures and machine readable instructions that may be executed to implement at least portions of the example media presentation and measurement system 100 of FIG. 1 and/or the example cooperative DRM 200 of FIG. 2 are shown in FIGS. 3-11. In these examples, the machine readable instructions represented by the flowcharts may comprise one or more programs for execution by: (a) a processor, such as the processor 1212 shown in the example computer 1200 discussed below in connection with FIG. 12, (b) a controller, and/or (c) any other suitable device. The one or more programs may be embodied in software stored on a tangible medium such as, for example, a flash memory, a CD-ROM, a floppy disk, a hard drive, a DVD-ROM, or a memory associated with the processor 1212, but persons of ordinary skill in the art will readily appreciate that the entire program or programs and/or portions thereof could alternatively be executed by a device other than the processor 1212 and/or embodied in firmware or dedicated hardware (e.g., implemented by an application specific integrated circuit (ASIC), a programmable logic device (PLD), a field programmable logic device (FPLD), discrete logic, etc.). For example, any or all of the media presentation and measurement system 100, the media processor 105, the display device 110, the cooperative media handler 150, the cooperative DRM 160, the cooperative DRM 200, the cooperative media handler connection processor 210, the communication processor 215, the measurement rights agreement interpreter 220, the measurement rights agreement retriever 225, the measurement rights agreement verifier 230, the measurement activator 235, the measurement rights revoker 240 and/or the panelist processor 245 could be implemented by any combination of software, hardware, and/or firmware. Also, some or all of the flowcharts of FIGS. 3-11 may be implemented as manual operations. Further, although the example procedures are described with reference to the flowcharts illustrated in FIGS. 3-11, persons of ordinary skill in the art will readily appreciate that many other techniques for implementing the example methods and apparatus described herein may alternatively be used. For example, with reference to the flowcharts illustrated in FIGS. 3-11, the order of execution of the blocks may be changed, and/or some of the blocks described may be changed, eliminated, combined and/or subdivided into multiple blocks.

Figure 3A:
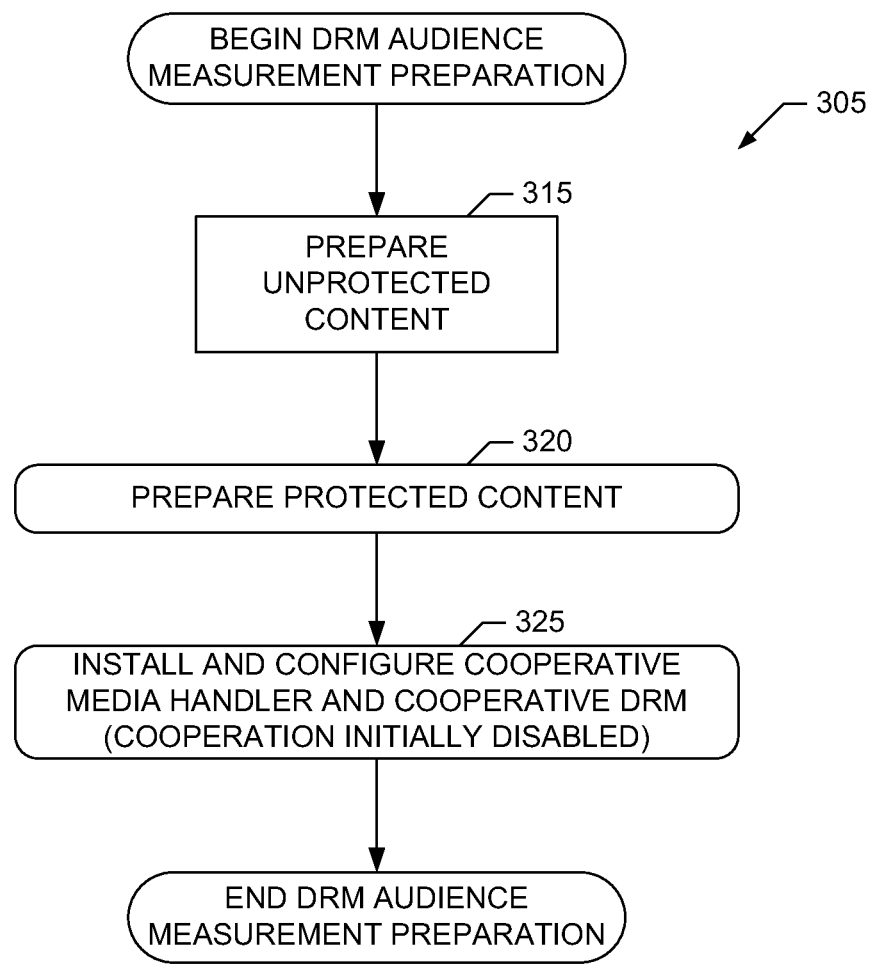
FIGS. 3A-B are flowcharts representative of example machine readable instructions for preparing and performing DRM-based audience measurement that may be executed to implement the example media presentation and measurement system of FIG. 1.
Figure 3B:
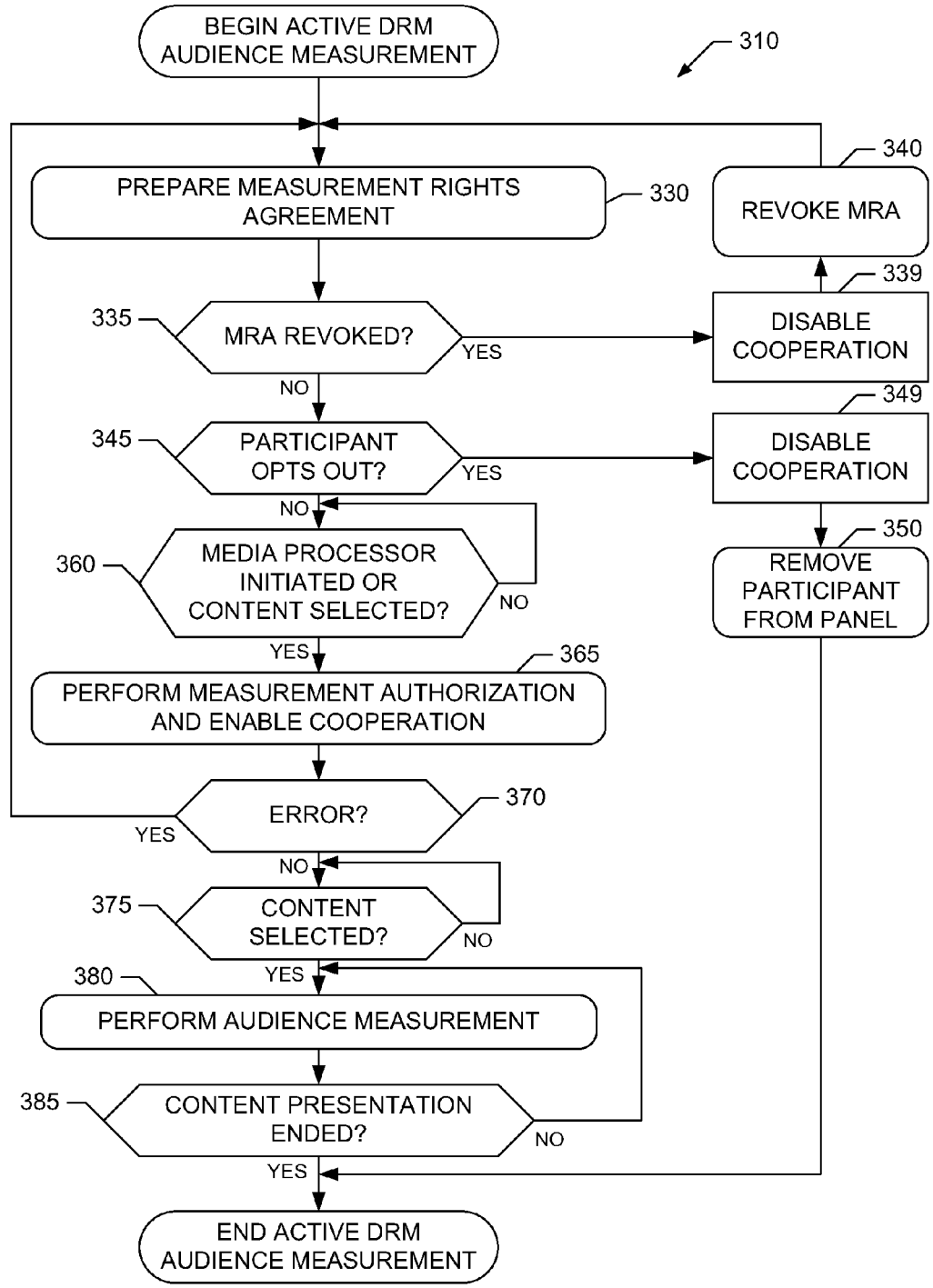

Example machine readable instructions comprising procedures 305 and 310 that may be used to implement the example media presentation and measurement system of FIG. 1 are shown in FIGS. 3A-B. The example procedures 305 and 310 may be implemented, at least in part, by machine readable instructions executed by a processor, such as the processor 1212 of FIG. 12. The two procedures 305 and 310 comprise a DRM audience measurement preparation procedure 305 and an active DRM measurement procedure 310, respectively. The DRM audience measurement preparation procedure 305 may be executed, for example, when media content is to be prepared for distribution via one or more media sources 125, when the cooperative media handler 150 and/or cooperative DRM 160 are developed, installed and/or configured for use with the media processor 105, etc. The active DRM measurement procedure 310 may be executed, for example, (1) when a measurement rights agreement 165 is prepared for the audience member 170 and/or the media processor 105, (2) when the audience member 170 decides to opt out of an audience measurement panel governed by the measurement rights agreement 165, (3) when the media measurement entity 135 decides to revoke the measurement rights agreement 165, (4) when the cooperative media handler 150 is to be configured in a cooperative mode to enable audience measurement, etc. Also, the example procedures 305 and 310 may be executed at predetermined intervals, based on an occurrence of a predetermined event, etc., or any combination thereof.

Figure 4:
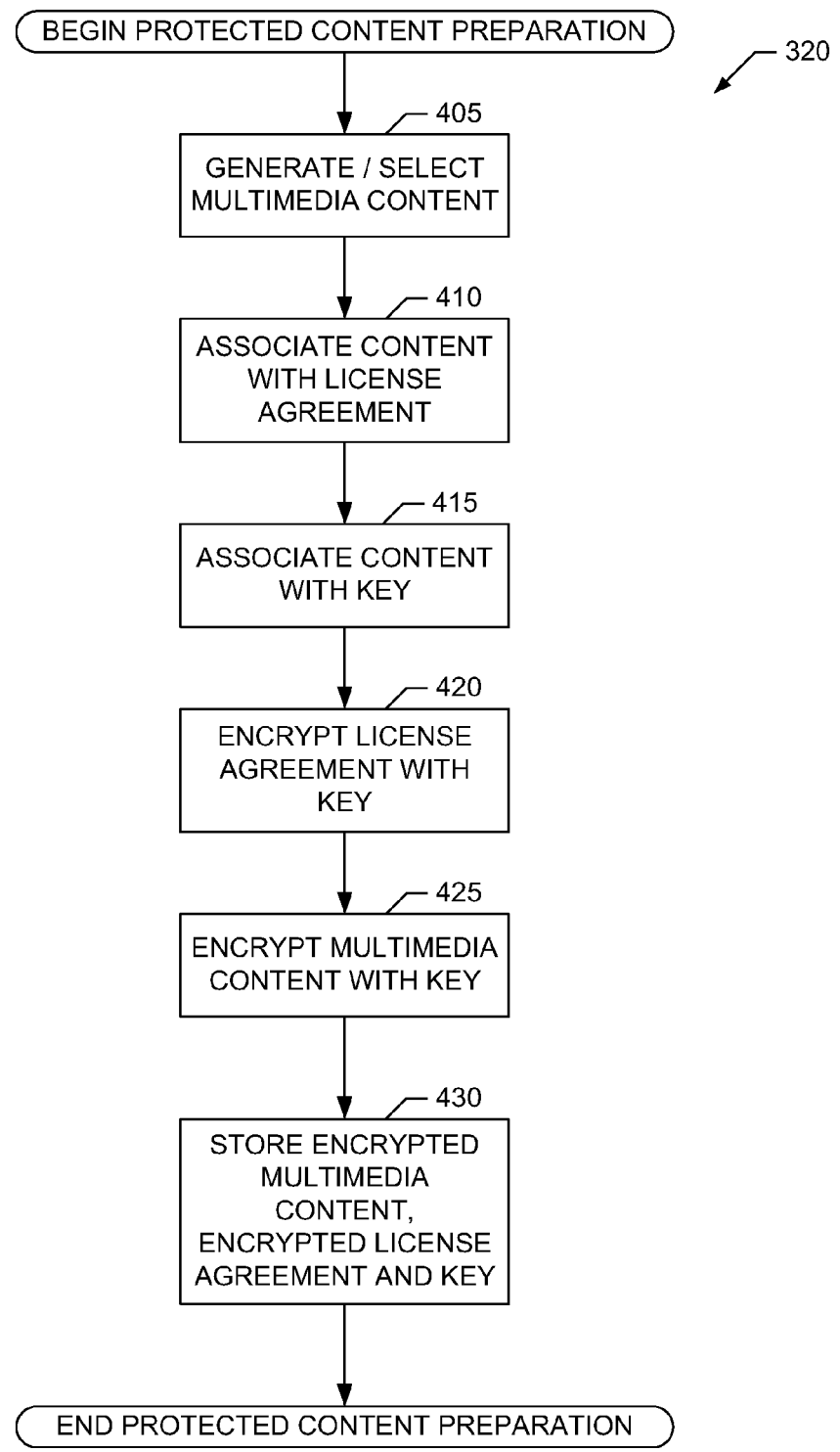
FIG. 4 is a flowchart representative of example machine readable instructions for preparing protected media content that may be executed to implement the example media presentation and measurement system of FIG. 1.

Referring also to the example media presentation and measurement system of FIG. 1, the example DRM audience measurement preparation procedure 305 begins execution at block 315 of FIG. 3A at which one or more content owners prepare unprotected content for distribution by one or more media sources 125. Unprotected content is typically not governed by any license agreement nor secured via any encryption technique and, thus, is accessible for presentation by any media consumer such as, for example, the audience member 170. Preparing unprotected content at block 305 may entail packetizing or serializing data and/or performing other actions to prepare the content for distribution. Control then proceeds to block 320 at which one or more content owners prepare protected content for distribution by one or more media sources 125. Protected content is typically governed by a license agreement and/or secured via one or more encryption techniques. Thus, the protected content is accessible for presentation only if the audience member 170 accepts and/or meets the terms of the governing license agreement, and thereby gains the ability to decrypt the protected content, etc. Example machine readable instructions for implementing block 320 are shown in FIG. 4 and discussed in greater detail below.

Figures 5A, 5B:
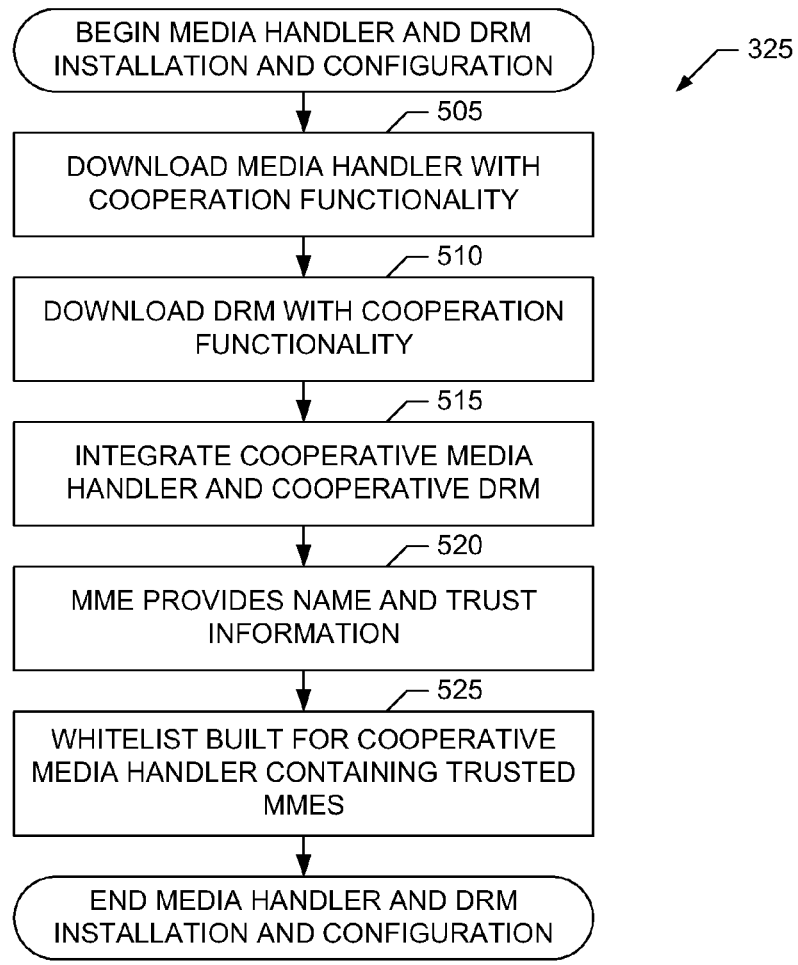
FIG. 5A is a flowchart representative of example machine readable instructions for installing and configuring a cooperative media handler and a cooperative digital rights manager that may be executed to implement the example media presentation and measurement system of FIG. 1.
FIG. 5B is a table representative of an example whitelist created by execution of the example machine readable instructions represented by FIG. 5B.

Next, control proceeds to block 325 at which the cooperative media handler 150 and cooperative DRM 160 are installed and/or configured for use with the media processor 105. Block 325 may be performed, for example, by a cooperative media handler manufacturer, a cooperative DRM manufacturer, a media processor manufacturer, the audience member 170 downloading and installing the cooperative media handler 150 and/or cooperative DRM 160, etc. Example machine readable instructions for implementing block 325 are shown in FIG. 5A and discussed in greater detail below. After execution at block 325 completes, the example DRM audience measurement preparation procedure 305 ends.

Figure 6:
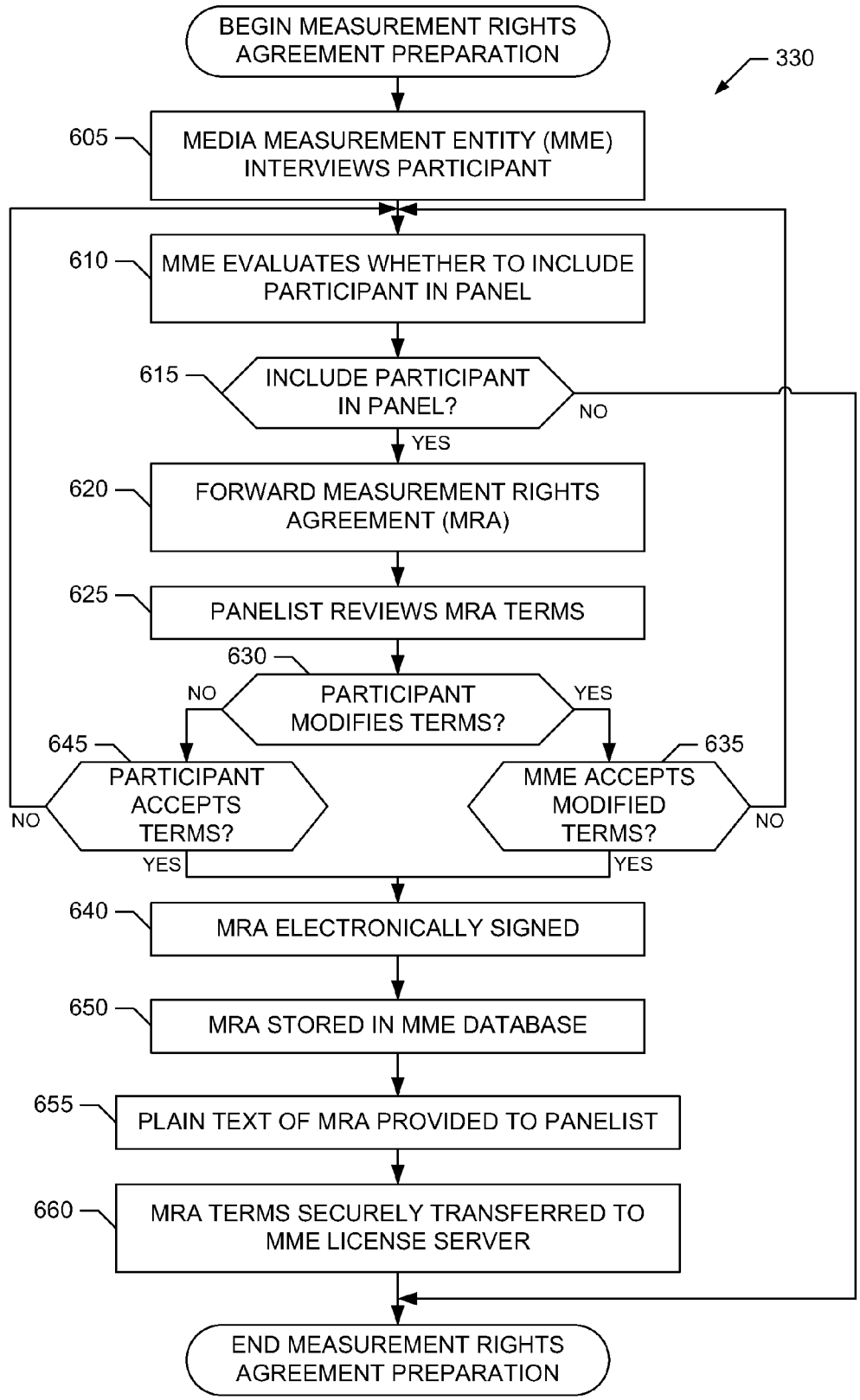
FIG. 6 is a flowchart representative of an example procedure (some blocks of which may be performed manually and some blocks of which are representative of example machine readable instructions to be executed by a machine) for preparing a measurement rights agreement.

Referring also to the example media presentation and measurement system of FIG. 1, the example active DRM audience measurement procedure 310 begins execution at block 330 of FIG. 3B at which a measurement rights agreement 165 is prepared to govern the relationship between the media measurement entity 135 and the audience member 170 (and/or, more generally, the media processor 105). Block 330 may be performed, for example, by a combination of the media measurement entity 135 and the audience member 170, as well as machine readable instructions executing, for example, on the license server 145, the media processor 105, the cooperative media handler 150, the cooperative DRM 160, etc. The measurement rights agreement 165 prepared at block 330 is used, for example, by the cooperative DRM 160 to determine whether to configure the cooperative media handler 150 into a cooperative mode, thereby allowing measurement of the audience member's consumption of media content. An example procedure for implementing block 330 is shown in FIG. 6 and discussed in greater detail below.

Figure 10:
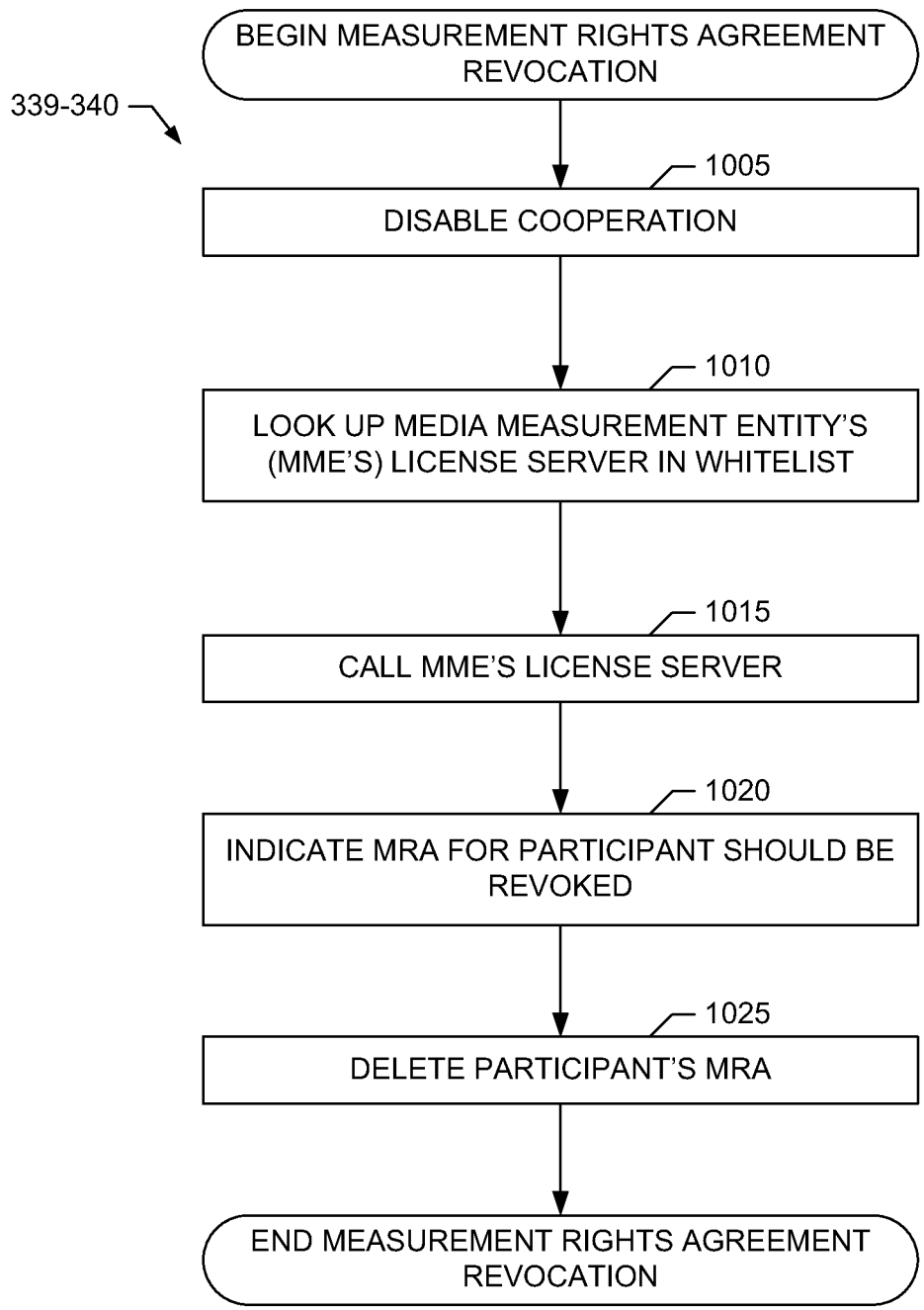
FIG. 10 is a flowchart representative of example machine readable instructions for revoking a measurement rights agreement that may be executed to implement the example media presentation and measurement system of FIG. 1.

Next, control proceeds to block 335 at which the cooperative DRM 160 determines whether the measurement rights agreement 165 has been revoked by the media measurement entity 135. The media measurement entity 135 may revoke the measurement rights agreement 165 for the audience member 170 (and/or, more generally, the media processor 105), for example, (1) on a periodic basis (and, thus, requiring continual renewal of the measurement rights agreement 165), (2) when the audience member 170 is removed from the audience measurement panel, (3) when any or all of the media processor 105, cooperative media handler 150 and/or cooperative DRM 160 are altered, (4) based on an agreement between the media measurement entity 135 and one or more of the media sources 125, etc. If the cooperative DRM 160 determines that the measurement rights agreement 165 has been revoked (block 335), control proceeds to block 339 at which the cooperative DRM 160 configures the cooperative media handler 150 to operate in a non-cooperative mode to disable audience measurement. The cooperative DRM 160 then signals the license server 145 to revoke the measurement rights agreement 165 at block 340. Control then proceeds back to block 330 and blocks subsequent thereto at which, for example, a new or renewed rights agreement 165 may be prepared for the audience member 170 (and/or, more generally, the media processor 105). Example machine readable instructions for implementing blocks 339 and 340 are shown in FIG. 10 and discussed in greater detail below.

Figure 11:
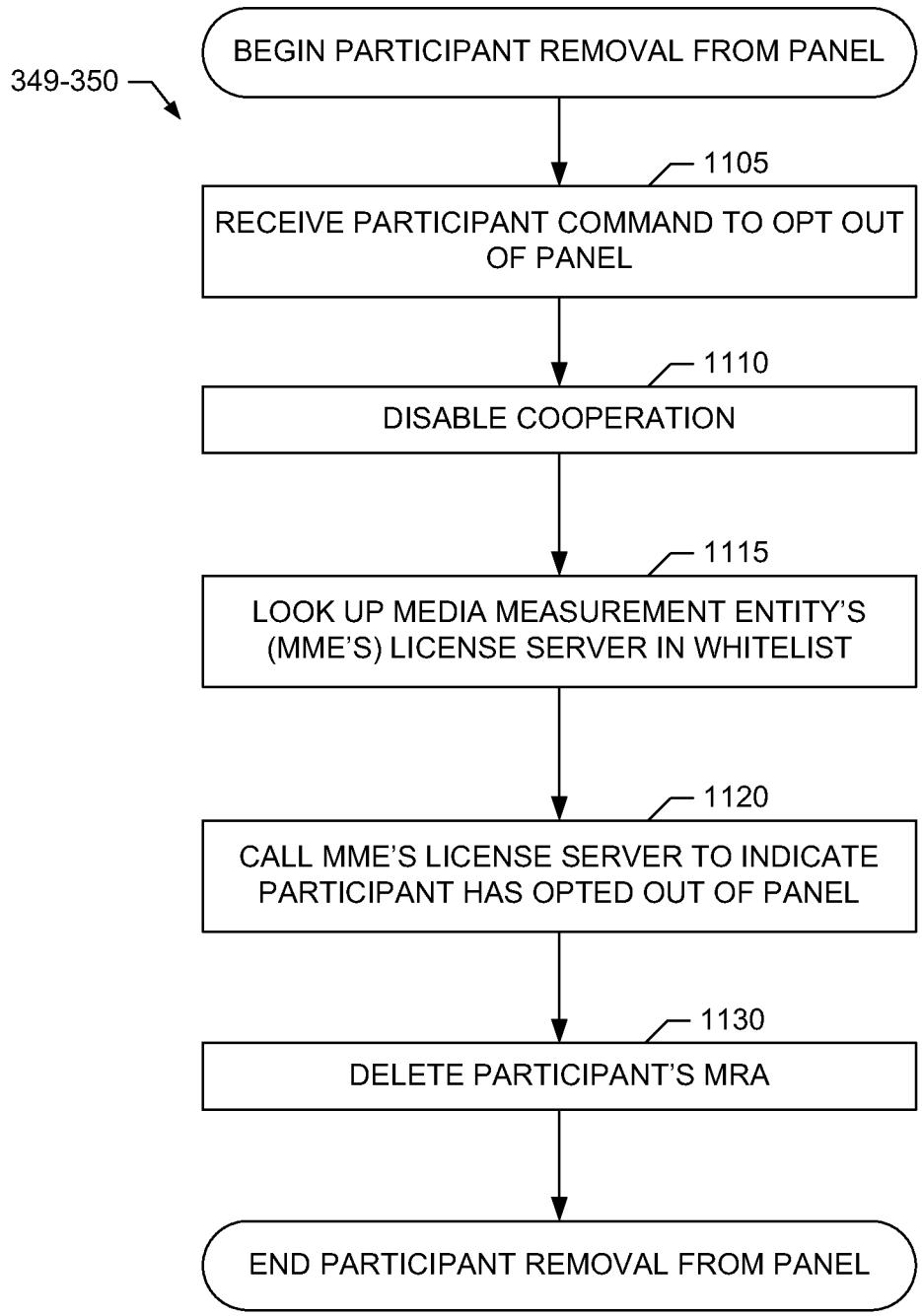
FIG. 11 is a flowchart representative of example machine readable instructions for removing a panelist from an audience measurement panel that may be executed to implement the example media presentation and measurement system of FIG. 1.

If, however, the cooperative DRM 160 determines that the measurement rights agreement 165 has not been revoked (block 335), control proceeds to block 345 at which the cooperative DRM 160 determines whether the audience member 170 has opted out of the audience measurement panel. If the audience member 170 has opted out (block 345), control proceeds to block 349 at which the cooperative DRM 160 configures the cooperative media handler 150 to operate in a non-cooperative mode to disable audience measurement. The cooperative DRM 160 then signals the license server 145 and/or the media measurement entity 135 to remove the audience member 170 (and/or the media processor 105) from the audience measurement panel at block 350. The example active DRM audience measurement procedure 310 then ends. Example machine readable instructions for implementing blocks 349 and 350 are shown in FIG. 11 and discussed in greater detail below.

If the audience member 170 has not opted out (block 345), control proceeds to block 360 at which the cooperative DRM 160 waits for a trigger to activate audience measurement. Example triggers include, for example, initiating any or all of the media processor 105, the cooperative media handler 150 and/or the cooperative DRM 160. Other example triggers include the audience member 170 selecting media content via the cooperative media handler 150, presenting media content via the cooperative media handler 150, etc. After the cooperative DRM 160 determines that a valid trigger has occurred (block 360), control proceeds to block 365.

Figure 7:
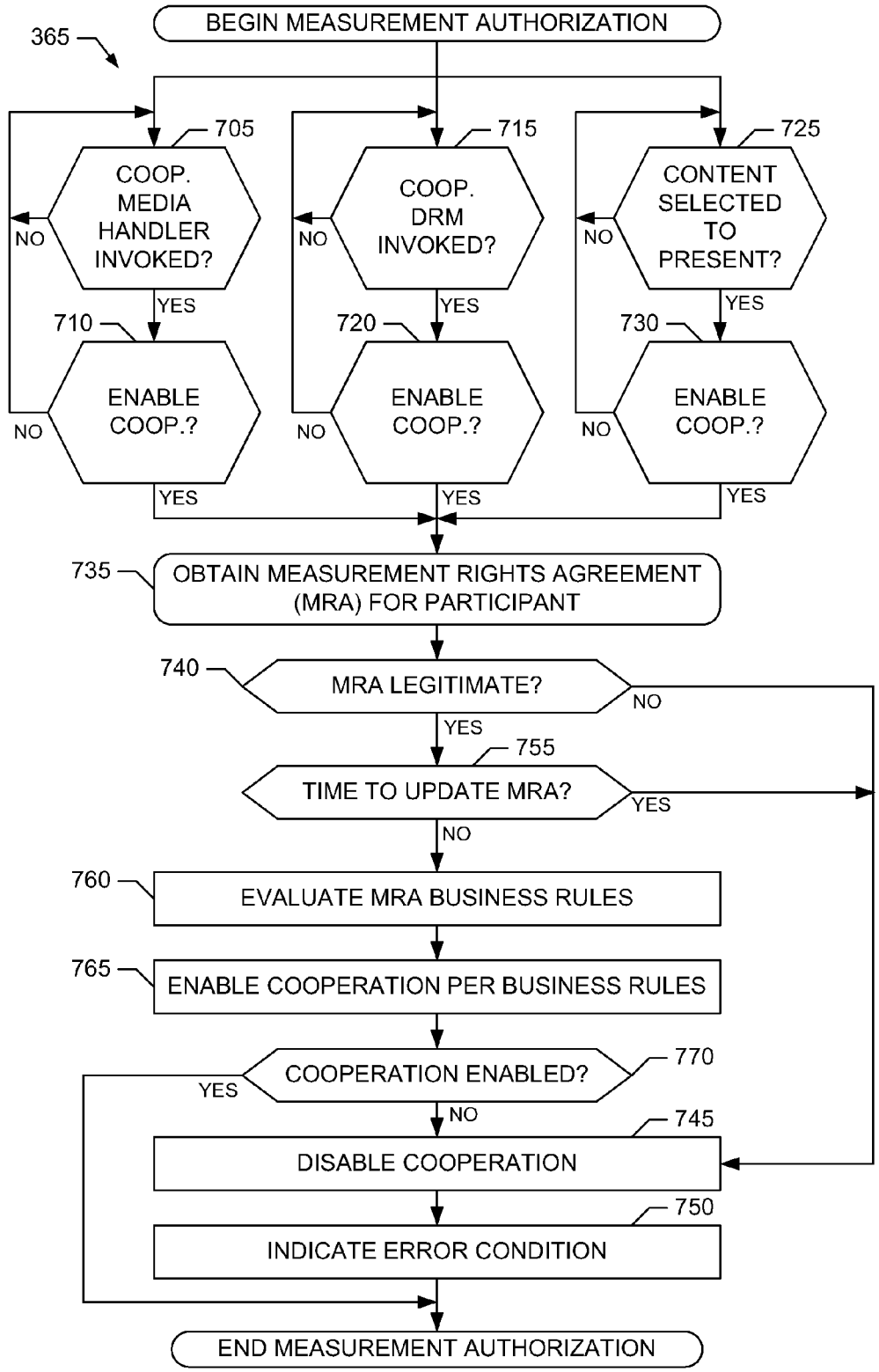
FIG. 7 is a flowchart representative of example machine readable instructions for authorizing measurement capability that may be executed to implement the example media presentation and measurement system of FIG. 1.

At block 365, the cooperative DRM 160 determines whether audience measurement is authorized and, if so, configures the cooperative media handler 150 to operate in a cooperative mode. The cooperative DRM 160 may determine whether audience measurement is authorized by, for example, processing the measurement rights agreement 165 to determine whether it is valid and/or whether the business rules (terms) contained in the measurement rights agreement 165 permit audience measurement. Additionally, the cooperative DRM 160 may process the business rules (terms) contained in the measurement rights agreement 165 to determine, for example, whether restrictions should be placed on the scope of measurement information to be collected (e.g., such as restrictions based on content source, type of media content, name of panelist, etc.). Based on the results of processing the measurement rights agreement 165, the cooperative DRM 160 determines whether to configure the cooperative media handler 150 in a cooperative mode to enable audience measurement and/or control the scope of measurement functionality of the cooperative media handler 150. Example machine readable instructions for implementing block 365 are shown in FIG. 7 and discussed in greater detail below.

Figure 9:
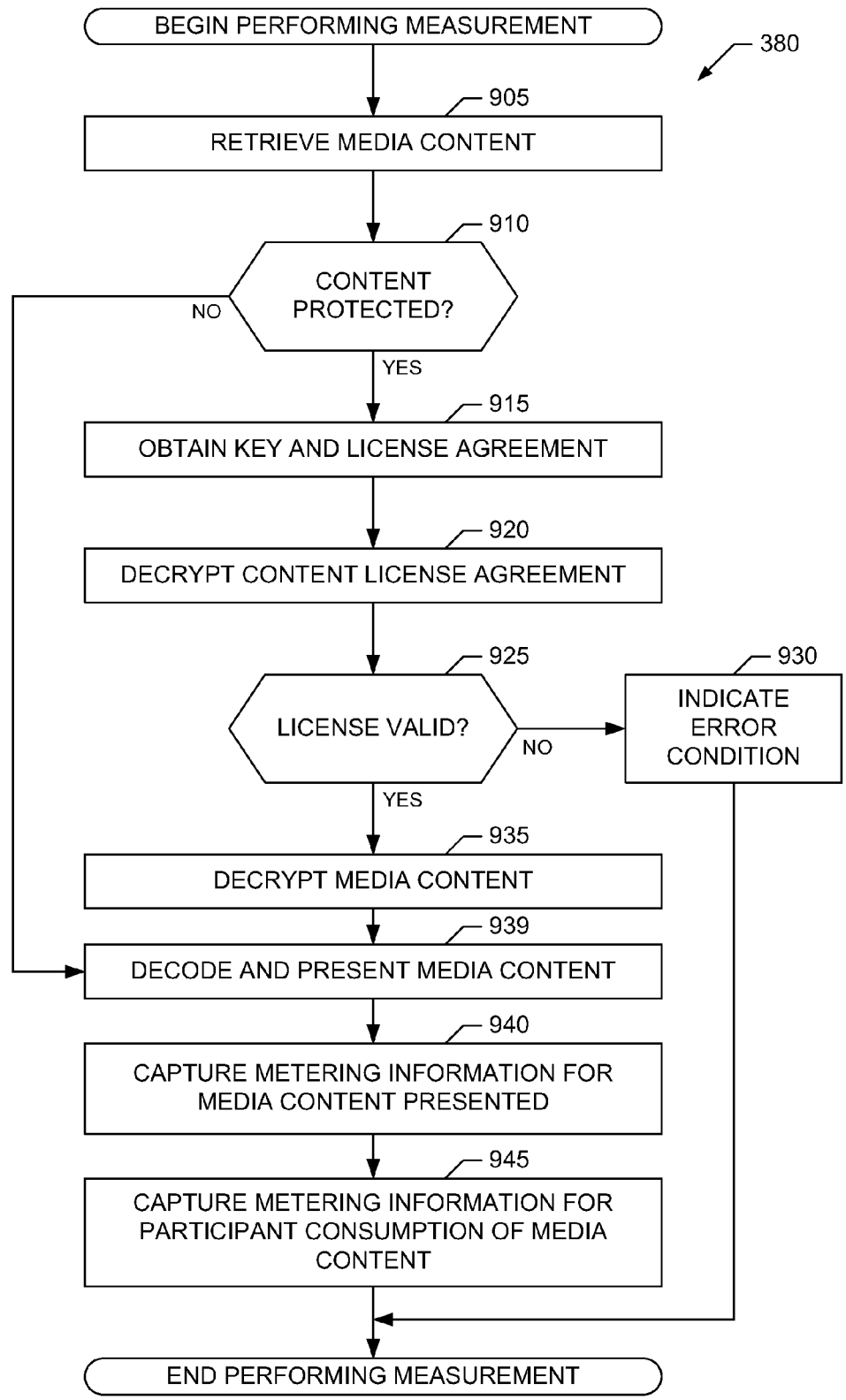
FIG. 9 is a flowchart representative of example machine readable instructions for performing measurements of consumed media content that may be executed to implement the example media presentation and measurement system of FIG. 1.

If at block 370 the cooperative DRM 160 determines that an error occurred during processing at block 365, control returns to block 330 and blocks subsequent thereto at which a new or updated measurement rights agreement 165 may be prepared in an attempt to overcome the detected error. However, if at block 370 the cooperative DRM 160 determines that no error occurred, then at block 365 audience measurement was authorized and, thus, the cooperative DRM 160 had enabled cooperation. In this latter case, control proceeds to block 375. At block 375, the cooperative media handler 150, now in a cooperative mode, waits for media content to be selected for presentation. After media content is selected for presentation (block 375), control proceeds to block 380 at which the cooperative media handler 150 performs audience measurement by measuring the audience member's consumption of the media content presented by the media processor 105. The cooperative media handler 150 may include software metering functionality capable of monitoring, for example, information (e.g., such as identification tags, metadata, etc.) embedded in the media content being presented and/or user commands input to the cooperative media handler 150 to control the presentation of the media content. The cooperative media handler 150 may collect this measurement information for reporting to the media measurement entity 135 per the terms of the measurement rights agreement 165. Example machine readable instructions for implementing block 380 are shown in FIG. 9 and discussed in greater detail below.

The cooperative media handler 150 continues to perform audience measurement until presentation of the selected content ends. As such, if at block 385 the cooperative media handler 150 determines that the selected content is still being presented, control returns to block 380 and the cooperative media handler 150 continues gathering measurement information. However, if the cooperative media handler 150 determines that presentation of the selected content has ended (block 385), active audience measurement stops and the example active DRM audience measurement procedure 310 ends.

Example machine readable instructions comprising a procedure 320 to prepare protected media content that may be used to implement block 320 of FIG. 3A are shown in FIG. 4. The example protected content preparation procedure 320 may be implemented, at least in part, by machine readable instructions executed by a processor, such as the processor 1212 of FIG. 12. Referring also to the example media presentation and measurement system of FIG. 1, the example active measurement procedure 320 of FIG. 4 begins execution at block 405, for example, when a content owner wishes to make media content available via one or more media sources 125 to media consumers under specified terms and conditions, such as, for example, in accordance with a rental agreement. At block 405, the content owner may generate and/or select the media content to be protected. The media content may include, for example, streaming audio and/or video content, audio and/or video content for download, etc.

Next, control proceeds to block 410 at which the content owner associates a license agreement with the media content generated and/or selected at block 405. The license agreement may contain, for example, the terms, conditions, restrictions, etc. governing the access and/or presentation of the media content. Next, at block 415 the content owner associates an encryption key with the media content generated and/or selected at block 405. The content owner uses the key selected at block 415 to encrypt the license agreement at block 420 and the media content at block 425 using any appropriate encryption technique, thereby protecting the license agreement and media content. Finally, at block 430, the content owner securely stores the key, protected license agreement and protected media content for access via one or more media sources 125. The example active measurement procedure 320 then ends.

At some later time, and as discussed below, a media consumer may access the protected content using, for example, any appropriate electronic commerce technique. For example, if the consumer rents the protected media content, the appropriate media source 125 provides the protected media content to the media handler 150 operating with the consumer's media processor 105. The protected content may also be stored on the consumer's media processor 105. Additionally, the appropriate media source 125 provides the key and protected license agreement containing the business rules governing the rental agreement associated with the protected content to the DRM 160 operating with the consumer's media processor 105. The DRM 160 securely stores the key and the license agreement for subsequent processing when the protected content is to be presented by the media processor 105.

Example machine readable instructions comprising a procedure 325 to develop, install and configure a cooperative media handler and cooperative DRM that may be used to implement block 325 of FIG. 3A are shown in FIG. 5A. The example installation and configuration procedure 325 may be implemented, at least in part, by machine readable instructions executed by a processor, such as the processor 1212 of FIG. 12. Referring also to the example media presentation and measurement system of FIG. 1, the example installation and configuration procedure 325 of FIG. 5A begins execution at block 505 at which functionality to implement the cooperative media handler 150 is downloaded to the media processor 105. For example, a software module provided by a cooperative media handler manufacturer may be downloaded to the media processor 105 to implement the cooperative media handler 150. Alternatively, a software update provided by the cooperative media handler manufacturer may be downloaded to convert a conventional media handler to the cooperative media handler 150. Similarly, at block 510 functionality to implement the cooperative DRM 160 is downloaded to the media processor 105. For example, a software module provided by a cooperative DRM manufacturer may be downloaded to the media processor 105 to implement the cooperative DRM 160. Alternatively, a software update provided by the cooperative DRM manufacturer may be downloaded to convert a conventional DRM to the cooperative DRM 160.

Next, at block 515 the cooperative media handler 150 resulting from block 505 and the cooperative DRM 160 resulting from block 510 are integrated. Persons having ordinary skill in the art will appreciate that the media handler manufacturer and DRM manufacturer may be the same entity or related entities such that the cooperative media handler 150 and cooperative DRM 160 resulting from blocks 505 and 510 are integrated by default. Alternatively, the media handler manufacturer and DRM manufacturer may be separate entities such that the cooperative media handler 150 and cooperative DRM 160 resulting from blocks 505 and 510 are independent but compatible. In the latter case, integration at block 515 may include configuring a secure path between the cooperative media handler 150 and cooperative DRM 160 to prevent, for example, spoofing of the cooperative DRM 160 such that the cooperative media handler 150 may be placed improperly into a cooperative mode, thereby inappropriately allowing audience measurement.

In a typical implementation, the cooperative media handler 150 and the cooperative DRM 160 are trusted components. To reduce the likelihood of spoofing the cooperative DRM 160 by a hostile agent, at block 520 each media measurement entity provides trust information including, for example, its name, digital signature for authentication and an address to its associated license server 145. Then, at block 525, a secure whitelist is built for access by the cooperative media handler 150 and/or the cooperative DRM 160. The whitelist contains the trust information associated with each media measurement entity and may be created prior to distribution to the consumer's media processor 105. Thus, the risks of spoofing are minimized because a license server 145 must be included in this whitelist for the DRM client 160 to access a measurement rights agreement 165 and to subsequently enable a cooperative mode of the cooperative media handler 150. The example installation and configuration procedure 325 then ends.

An example whitelist 550 that may be created by the example installation and configuration procedure 325 of FIG. 5A is shown in FIG. 5B. The example whitelist 550 stores the names 555 of media measurement entities 135 that have established a trusted relationship with the manufacturer or manufacturers of the cooperative media handler 150 and/or the cooperative DRM 160. The example whitelist also contains authentication signatures 560 for each media measurement entity 135 and addresses 565 for their respective license servers 145. For instance, the example whitelist of FIG. 5B includes the name 570 for a media measurement entity "alpha," and the corresponding authentication signature 574 and license server address 578. Similarly, the example whitelist 550 includes the name 580 for a media measurement entity "beta," and the corresponding authentication signature 584 and license server address 588.

An example procedure 330 to prepare a measurement rights agreement that may be used to implement block 330 of FIG. 3B is shown in FIG. 6. The example measurement rights agreement preparation procedure 330 is implemented, at least in part, by machine readable instructions executed by a processor, such as the processor 1212 of FIG. 12. Referring also to the example media presentation and measurement system of FIG. 1, the example measurement rights agreement preparation procedure 330 may be executed when a media consumer, such as the audience member 170, agrees to have his or her consumption of media content measured by the media measurement entity 135. The media measurement entity 135 creates a corresponding measurement rights agreement 165 that can be read by the cooperative DRM 160 operating with the media processor 105 belonging to the audience member 170. As discussed previously, the cooperative DRM 160 configures the cooperative media handler 150 to operate in a cooperative mode to gather measurement information concerning presented media content based on the business rules (terms) included in the measurement rights agreement 165.

Turning to FIG. 6, the example measurement rights agreement preparation procedure 330 begins execution at block 605 at which the media measurement entity 135 interviews the audience member 170 for participation in an audience measurement panel. The interview may be conducted either in-person or remotely using, for example, as telephone, chat, videoconferencing, etc. During the interview, the audience member 170 provides his or her demographic information to the media measurement entity 135. Next, at block 610 the media measurement entity 135 evaluates the demographic information provided by the audience member 170 to determine whether to include the audience member 170 in the audience measurement panel. At block 615, the media measurement entity 135 makes its selection determination. If the media measurement entity 135 decides not to include the audience member 170 in the audience measurement panel (block 615), the example measurement rights agreement preparation procedure 330 ends. However, if the media measurement entity 135 decides to include the audience member 170 in the audience measurement panel (block 615), control proceeds to block 620.

At block 620, the media measurement entity 135 provides the audience member 170 with a measurement rights agreement 165. Example business rules (terms) that may be included in the measurement rights agreement 165 are described above in connection with FIG. 1. Next, at block 625, the audience member 170 reviews the terms of the measurement rights agreement 165. For example, the operations at block 620 and 625 may be conducted during the interview in which the business rules (terms) of the measurement rights agreement 165 are described to the audience member 170. Alternatively, the default measurement rights agreement 165 may be provided electronically via the license server 145 for display in a human-readable form to the audience member 170 via the media processor 105. In any case, at block 625 the audience member 170 may interactively opt-in and opt-out of various business rules (terms), thereby creating a customized relationship between the media measurement entity 135 and the audience member 170. For example, if the default measurement rights agreement 165 is displayed to the audience member 170 via the media processor 105, an electronic interface may also be implemented by the media processor 105 to allow the audience member 170 to interactively select whether to opt-in or opt-out of the various business rules (terms) by pressing virtual buttons, inserting virtual checkmarks, etc., via the electronic interface. Additionally, the relationship between the media measurement entity 135 and the audience member 170 may include consideration (monetary or otherwise) provided to the audience member 170 for his or her participation in the panel.

If the audience member 170 modifies the default business rules (terms) of the measurement rights agreement 165 (block 630), control proceeds to block 635 at which the media measurement entity 135 decides whether to accept the modified terms. If the media measurement entity 135 does not accept the modified terms, control returns to block 610 and blocks subsequent thereto, thereby allowing the media measurement entity 135 to re-evaluate whether to include the audience member 170 in the audience measurement panel, possibly under a new measurement rights agreement 165. If, however, the media measurement entity 135 does accept the modified terms (block 635), control proceeds to block 640 discussed below. Alternatively, if the audience member 170 did not modify the default measurement rights agreement 165 (block 630), control proceeds to block 645. At block 645, if the audience member 170 did not accept the default measurement rights agreement 165, control returns to block 610 and blocks subsequent thereto, thereby allowing the media measurement entity 135 to re-evaluate whether to include the audience member 170 in the audience measurement panel, possibly under a new measurement rights agreement 165. If, however, the audience member 170 did accept the default measurement rights agreement 165, control proceeds to block 640.

At block 640, the audience member 170 and the media measurement entity 135 have agreed to the measurement rights agreement 165 and, thus, the audience member may electronically sign the measurement rights agreement 165 using any appropriate technique. (The electronic signing of block 640 may be the acceptance represented by block 645.) Next, at block 650, a copy of the agreed upon measurement rights agreement 165 may be stored by the media measurement entity 135 in a database. Additionally, at block 655 a plain language version of the agreed upon measurement rights agreement 165 may be made available to the audience member 170. For example, the plain language version of the agreed upon measurement rights agreement 165 may be provided via a website, sent via mail, made accessible for display via the media processor 105, etc. Finally, at block 660 an electronic version of the agreed upon measurement rights agreement 165 is securely transferred to the license server 145 associated with the media measurement entity 135. The measurement rights agreement 165 is stored on the license server 145 such that the measurement rights agreement 165 may be accessed by the cooperative DRM 160 to enable measurement of the presentation of media content by the media processor 105. The example measurement rights agreement preparation procedure 330 then ends.

Example machine readable instructions comprising a procedure 365 to authorize measurement of media content presented by a media processor that may be used to implement block 365 of FIG. 3B are shown in FIG. 7. The measurement authorization procedure 365 may be implemented, at least in part, by machine readable instructions executed by a processor, such as the processor 1212 of FIG. 12. Referring also to the example media presentation and measurement system of FIG. 1, the example measurement authorization procedure 365 begins by evaluating which trigger condition caused the measurement authorization procedure 365 to be invoked. As discussed above in connection with block 360 of FIG. 3B, example triggers include, for example, initiating any or all of the media processor 105, the cooperative media handler 150 and/or the cooperative DRM 160. Other example triggers include the audience member 170 selecting media content via the cooperative media handler 150, presenting media content via the cooperative media handler 150, etc. For example, at block 705 the cooperative DRM 160 determines whether the trigger corresponds to invocation of the cooperative media handler 150. If the cooperative media handler 150 was invoked (block 705), control proceeds to block 710 at which the cooperative DRM 160 determines whether measurement authorization has been configured to be triggered by invocation of the cooperative media handler 150. If measurement authorization has been configured to be triggered by invocation of the cooperative media handler 150 (block 710), control proceeds to block 735. Otherwise, the cooperative DRM 160 examines whether the trigger corresponds to another event. For example, similar to the processing at blocks 705-710, at blocks 715-720 the cooperative DRM 160 determines whether the trigger corresponds to invocation of the cooperative DRM 160 itself and whether measurement authorization should be triggered by such an event. Similarly, at blocks 725-730 the cooperative DRM 160 determines whether the trigger corresponds to a selection of media content to be presented by the media processor 105 and whether measurement authorization should be triggered by such an event.

Figure 8:
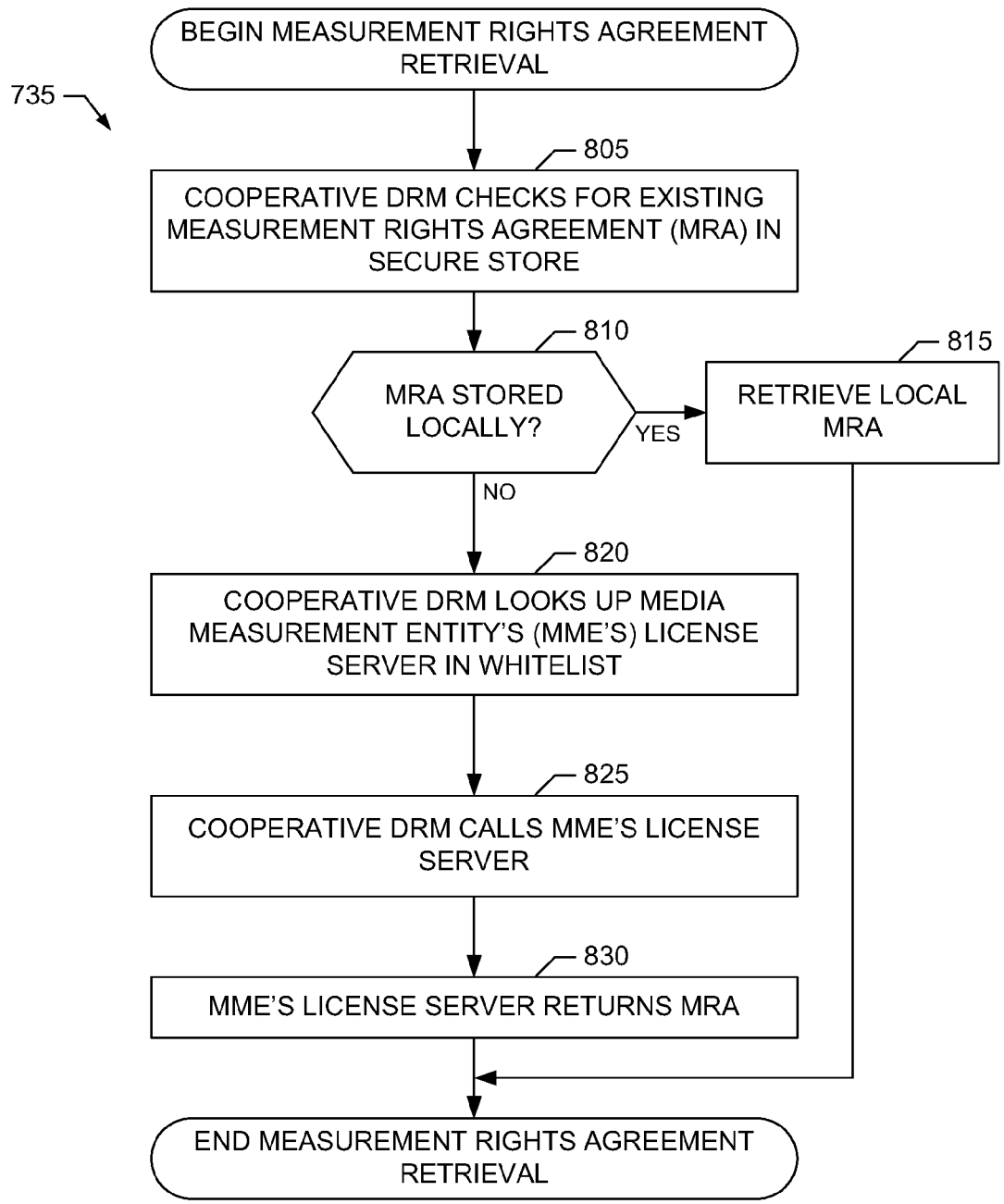
FIG. 8 is a flowchart representative of example machine readable instructions for obtaining a measurement rights agreement that may be executed to implement the example media presentation and measurement system of FIG. 1.

Once the cooperative DRM 160 determines that measurement authorization should be performed based on the trigger condition examined at blocks 705-730, control proceeds to block 735 at which the cooperative DRM 160 obtains the measurement rights agreement 165 associated with the audience member 170 and/or the media processor 105 to be measured. For example, the measurement rights agreement 165 may be retrieved from the license server 145 associated with the media measurement entity 135. Additionally or alternatively, the measurement rights agreement 165 may be stored locally in a storage unit 175 accessible by the cooperative DRM 160. Example machine readable instructions for implementing block 330 are shown in FIG. 8 and discussed in greater detail below.

Next, control proceeds to block 740 at which the cooperative DRM 160 checks the legitimacy of the measurement rights agreement 160 obtained at block 730. For example, the cooperative DRM 160 may validate the integrity and authenticity of the measurement rights agreement 165 based on an authentication signature contained in a whitelist (e.g. such as the whitelist 550 of FIG. 5B) associated with the media measurement entity 135. If the cooperative DRM 160 determines that the measurement rights agreement 165 is not legitimate (block 740), control proceeds to block 745 at which the cooperative DRM 160 ensures that the cooperative media handler 150 is configured in a non-cooperative mode, thereby disabling audience measurement. Control them proceeds to block 750 at which the cooperative DRM 160 may indicate an appropriate error condition (e.g., for display by the media processor 105 and/or subsequent processing by the cooperative DRM 160). The example measurement authorization procedure 365 then ends.

However, if the measurement rights agreement 165 is legitimate (block 740), control proceeds to block 755 at which the cooperative DRM 160 determines whether there is a renewal or update time specified for the measurement rights agreement 165. For example, the cooperative DRM 160 may compare a time specified in the measurement rights agreement 165 to a trusted clock source associated with the cooperative DRM 160. If the cooperative DRM 160 determines that it is time to update and/or renew the measurement rights agreement 165 (block 755), control proceeds to block 745 at which the cooperative DRM 160 ensures that the cooperative media handler 150 is configured in a non-cooperative mode, thereby disabling audience measurement. Control then proceeds to block 750 at which the cooperative DRM 160 may indicate an appropriate error condition (e.g., for display by the media processor 105 and/or subsequent processing by the cooperative DRM 160) such as a notification that the measurement rights agreement 165 has expired and must be renewed. The example measurement authorization procedure 365 then ends.

If, however, the cooperative DRM 160 determines that it is not time to update and/or renew the measurement rights agreement 165 (block 755), control proceeds to block 760 at which the cooperative DRM 160 evaluates the business rules (terms) contained in the measurement rights agreement 165. Next, control proceeds to block 765 at which the cooperative DRM 160 configures the cooperative media handler 150 to operate in a cooperative mode and collect measurement information per the business rules (terms) in the measurement rights agreement 165. Then, at block 770 the cooperative DRM 160 determines whether the cooperative media handler 150 was configured to operate in a cooperative mode according to the business rules (terms) contained in the measurement rights agreement 165. If the cooperative media handler 150 was configured to a cooperative mode (block 770), measurement was authorized and the example measurement authorization procedure 365 ends. If, however, the cooperative media handler 150 was not configured to a cooperative mode (block 770), measurement was not authorized and control proceeds to block 745 at which the cooperative DRM 160 ensures that the cooperative media handler 150 is configured in a non-cooperative mode, thereby disabling audience measurement. Control them proceeds to block 750 at which the cooperative DRM 160 may indicate an appropriate error condition (e.g., for display by the media processor 105 and/or subsequent processing by the cooperative DRM 160). The example measurement authorization procedure 365 then ends.

Example machine readable instructions comprising a procedure 735 to retrieve a measurement rights agreement that may be used to implement block 735 of FIG. 7 are shown in FIG. 8. The measurement rights agreement retrieval procedure 735 may be implemented, at least in part, by machine readable instructions executed by a processor, such as the processor 1212 of FIG. 12. Referring also to the example media presentation and measurement system of FIG. 1, the example measurement rights agreement retrieval procedure 735 begins at block 805 at which the cooperative DRM 160 checks whether the measurement rights agreement 165 was previously retrieved and stored locally (e.g., such as stored in the local storage unit 175). If the measurement rights agreement 165 is stored locally (block 810), control proceeds to block 815 at which the cooperative DRM 160 retrieves the measurement rights agreement 165 from local storage. The example measurement rights agreement retrieval procedure 735 then ends.

However, if the measurement rights agreement 165 is not stored locally (block 810), control proceeds to block 820 at which the cooperative DRM 160 looks up the address of the license server 145 associated with the media measurement entity 135 from a whitelist accessible by the cooperative DRM 160 (e.g., such as the whitelist 550 of FIG. 5). The whitelist may be stored in the media processor 105, stored with the cooperative media handler 150, stored with the cooperative DRM 160, etc. Next, control proceeds to block 825 at which the cooperative DRM 160 requests the measurement rights agreement 165 from the license server 145 based on the address information obtained at block 820. Then, at block 830 the license server 145 associated with the media measurement entity 135 issues the measurement rights agreement 165 associated with the media processor 105 and/or the audience member 170. The example measurement rights agreement retrieval procedure 735 then ends.

Example machine readable instructions comprising a procedure 380 to measure the consumption of media content that may be used to implement block 380 of FIG. 3B are shown in FIG. 9. The measurement authorization procedure 380 may be implemented, at least in part, by machine readable instructions executed by a processor, such as the processor 1212 of FIG. 12. Referring also to the example media presentation and measurement system of FIG. 1, the example measurement procedure 380 begins at block 905 at which the cooperative media handler 150 retrieves media content from one or more of the media sources 125. The media content to be retrieved at block 905 may be selected, for example, by an input from the audience member 170 to the media processor 105 (e.g., such as through the remote control processor 115). Control then proceeds to block 910 at which the cooperative DRM 160 determines whether the media content is protected. If the media content is protected (block 910), control proceeds to block 915 at which the cooperative DRM 160 obtains a key and protected license agreement associated with the protected media content retrieved at block 905. For example, the key and protected license agreement may have been provided by the media source 125 along with the protected content at block 905.

Next, control proceeds to block 920 at which the cooperative DRM 160 unlocks the license agreement with the key and interprets the business rules contained in the license agreement. Control then proceeds to block 925 at which the cooperative DRM 160 determines whether the license agreement is valid using any appropriate technique. If the license agreement is not valid (block 925), control proceeds to block 930 at which the cooperative DRM 160 indicates an appropriate error condition (e.g., for display by the media processor 105 and/or subsequent processing by the cooperative DRM 160). The example measurement procedure 380 then ends. However, if the license agreement is valid (block 925), control proceeds to block 935 at which the cooperative DRM 160 decrypts the protected media content and provides the content to the cooperative media handler 150.

If the cooperative DRM 160 determines that the media content is unprotected (block 910) or decrypts the media content if it is protected (block 935), control proceeds to block 939 at which the media content is then provided to the cooperative media handler 150 for decoding (if necessary) and presentation to the audience member 170 via the display device 110 used with media processor 105. Control then proceeds to block 940 at which the cooperative media handler 150 captures metering information corresponding to the presentation of the media content. For example, the cooperative media handler 150 may include software metering functionality capable of processing information (e.g., such as identification tags, metadata, etc.) embedded in the media content, timestamping such information and/or recording the identity or identities of audience member(s) by, for example, prompting the audience member(s) to enter identity identification data. Next, control proceeds to block 945 at which the cooperative media handler 150 may also capture metering information corresponding to how the audience member 170 consumes the media content (e.g., fast forward, rewind, pause and/or other commands). For example, the cooperative media handler 150 may capture user commands input to the cooperative media handler 150 to control the presentation of the media content. At blocks 940 and 945, the cooperative media handler 150 may store the collected metering information and transmit the stored metering information to the media measurement entity 135. The cooperative media handler 150 continues gathering metering information at blocks 940 and 945 until the example metering procedure 380 ends (e.g., such as when presentation of the media content ends as discussed above in connection with FIG. 3B.)

Example machine readable instructions comprising a procedure 339-340 to revoke a measurement rights agreement that may be used to implement blocks 339 and 340 of FIG. 3B are shown in FIG. 10. The measurement rights agreement revocation procedure 339-340 may be implemented, at least in part, by machine readable instructions executed by a processor, such as the processor 1212 of FIG. 12. Referring also to the example media presentation and measurement system of FIG. 1, the example measurement rights agreement revocation procedure 339-340 begins at block 1005 at which the cooperative DRM 160 configures the cooperative media handler 150 to operate in a non-cooperative mode to disable audience measurement. Control then proceeds to block 1010 at which the cooperative DRM 160 looks up the address of the license server 145 associated with the media measurement entity 135 from a whitelist accessible by the cooperative DRM 160 (e.g., such as the whitelist 550 of FIG. 5). The whitelist may be stored in the media processor 105, stored with the cooperative media handler 150, stored with the cooperative DRM 160, etc.

Next, control proceeds to block 1015 at which the cooperative DRM 160 calls the license server 145 based on the address information obtained at block 1010. Control then proceeds to block 1020 at which the cooperative DRM 160 informs the license server 145 that the measurement rights agreement 165 associated with the media processor 105 and/or the audience member 170 should be revoked. Next, at block 1025 the license server 145 associated with the media measurement entity 135 revokes the measurement rights agreement 165 associated with the media processor 105 and/or the audience member 170 by deleting the measurement rights agreement 165 from memory. The example measurement rights agreement revocation procedure 339-340 then ends. Persons having ordinary skill in the art will appreciate that the media measurement entity 135 may also revoke the measurement rights agreement 165 on its own initiative by deleting the measurement rights agreement 165 from the license server 145.

Example machine readable instructions comprising a procedure 349-350 to remove an audience member (also known as a panelist) from an audience measurement panel that may be used to implement blocks 349 and 350 of FIG. 3B are shown in FIG. 11. The panelist removal procedure 349-350 may be implemented, at least in part, by machine readable instructions executed by a processor, such as the processor 1212 of FIG. 12. Referring also to the example media presentation and measurement system of FIG. 1, the panelist removal procedure 349-350 begins at block 1105 at which the cooperative DRM 160 determines that the audience member 170 has decided to opt out of the audience measurement panel, for example, via input from the audience member 170 to the media processor 105. Control then proceeds to block 1110 at which the cooperative DRM 160 configures the cooperative media handler 150 to operate in a non-cooperative mode to disable audience measurement. Control then proceeds to block 1115 at which the cooperative DRM 160 looks up the address of the license server 145 associated with the media measurement entity 135 from a whitelist accessible by the cooperative DRM 160 (e.g., such as the whitelist 550 of FIG. 5). The whitelist may be stored in the media processor 105, stored with the cooperative media handler 150, stored with the cooperative DRM 160, etc.

Next, control proceeds to block 1120 at which the cooperative DRM 160 sends a message to the license server 145 based on the address information obtained at block 1110 to inform the license server 145 that the audience member 170 has opted out of the audience measurement panel. Next, at block 1130 the license server 145 associated with the media measurement entity 135 removes the audience member 170 from the audience measurement panel by deleting the measurement rights agreement 165 from memory. The example panelist removal procedure 350 then ends. Persons having ordinary skill in the art will appreciate that the media measurement entity 135 may also remove the audience member 170 from the audience measurement panel on its own initiative by deleting the measurement rights agreement 165 associated with the audience member 170 from the license server 145.

Figure 12:
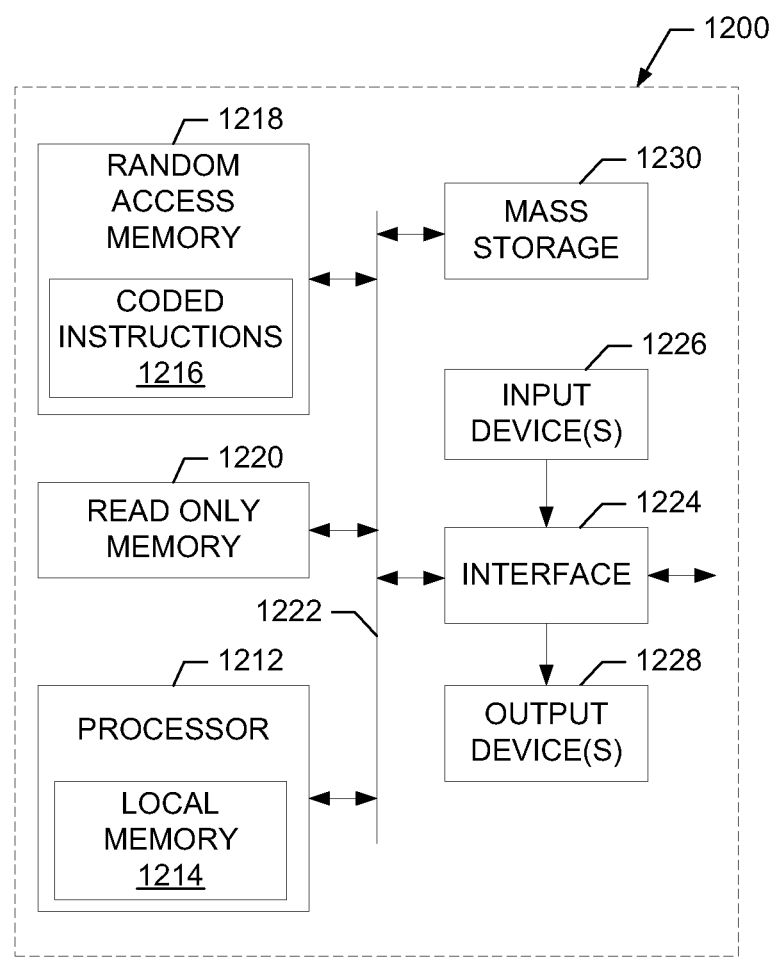
FIG. 12 is a block diagram of an example computer that may execute the example machine readable instructions represented by FIGS. 3A, 3B, 4, 5A, 6-10 and/or 11 to implement the example media presentation and measurement system of FIG. 1 and/or the example cooperative digital rights manager of FIG. 2.

FIG. 12 is a block diagram of an example computer 1200 capable of implementing the apparatus and methods disclosed herein. The computer 1200 can be, for example, a server, a personal computer, a personal digital assistant (PDA), an Internet appliance, a DVD player, a CD player, a digital video recorder, a personal video recorder, a set top box, or any other type of computing device.

The system 1200 of the instant example includes a processor 1212 such as a general purpose programmable processor. The processor 1212 includes a local memory 1214, and executes coded instructions 1216 present in the local memory 1214 and/or in another memory device. The processor 1212 may execute, among other things, some or all of the machine readable instructions represented in FIGS. 3-11. The processor 1212 may also be used to implement any or all of the media presentation and measurement system 100, the media processor 105, the display device 110, the cooperative media handler 150, the cooperative DRM 160, the cooperative DRM 200, the cooperative media handler connection processor 210, the communication processor 215, the measurement rights agreement interpreter 220, the measurement rights agreement retriever 225, the measurement rights agreement verifier 230, the measurement activator 235, the measurement rights revoker 240 and/or the panelist processor 245. The processor 1212 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1212 is in communication with a main memory including a volatile memory 1218 and a non-volatile memory 1220 via a bus 1222. The volatile memory 1218 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1220 may be implemented by flash memory and/or any other desired type of memory device. Access to the main memory 1218, 1220 is typically controlled by a memory controller (not shown) in a conventional manner.

The computer 1200 also includes a conventional interface circuit 1224. The interface circuit 1224 may be implemented by any type of interface standard, such as an Ethernet interface, a universal serial bus (USB), and/or a third generation input/output (3GIO) interface.

One or more input devices 1226 are connected to the interface circuit 1224. The input device(s) 1226 permit a user to enter data and commands into the processor 1212. The input device(s) can be implemented by, for example, a keyboard, a mouse, a touchscreen, a track-pad, a trackball, an isopoint and/or a voice recognition system.

One or more output devices 1228 are also connected to the interface circuit 1224. The output devices 1228 can be implemented, for example, by display devices (e.g., a liquid crystal display, a cathode ray tube display (CRT)), by a printer and/or by speakers. The interface circuit 1224, thus, typically includes a graphics driver card.

The interface circuit 1224 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1200 also includes one or more mass storage devices 1230 for storing software and data. Examples of such mass storage devices 1230 include floppy disk drives, hard drive disks, compact disk drives and digital versatile disk (DVD) drives.

As an alternative to implementing the methods and/or apparatus described herein in a system such as the device of FIG. 12, the methods and or apparatus described herein may be embedded in a structure such as a processor and/or an ASIC (application specific integrated circuit).

U.S. patent application Ser. No. 11/968,991, filed on Jan. 3, 2008, International Application Serial No. PCT/US07/069,563, filed on May 23, 2007, and U.S. Provisional Application Ser. No. 60/810,745, filed on Jun. 2, 2006, are hereby incorporated by reference in their respective entireties.

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to monitor a media presentation, the method comprising:
    determining whether a measurement rights agreement is stored locally in a media device including a digital rights manager;
    when the measurement rights agreement is determined to not be stored locally, retrieving the measurement rights agreement from a license server;
    processing (1) the measurement rights agreement obtained from the license server and (2) a license agreement separate from the measurement rights agreement with the digital rights manager, the digital rights manager implemented by a processor, the processing of the measurement agreement with the digital rights manager comprising making a first determination indicating whether the measurement rights agreement authorizes monitoring of a media presentation presented by a media handler included in the media device, the processing of the license agreement with the digital rights manager comprising making a second determination indicating whether the media handler is authorized to present the media presentation, the license server being separate from the media device including the digital rights manager and the media handler;
    when the digital rights manager determines that monitoring of the media presentation is authorized based on the processing of the measurement rights agreement, configuring, via the processor, the media handler to obtain measurement information corresponding to the media presentation; and
    when the digital rights manager determines that monitoring of the media presentation is not authorized based on the processing of the measurement rights agreement, configuring, via the processor, the media handler to prevent measurement information corresponding to the media presentation from being obtained, but not preventing the media handler from being configured to present the media presentation.

2. A method as defined in claim 1 further comprising initiating the processing of the measurement rights agreement in response to at least one of: (1) detection of an invocation of the digital rights manager, (2) detection of an invocation of the media handler, or (3) detection of a selection of media for presentation by the media handler.

3. A method as defined in claim 1 further comprising:
identifying an audience member associated with the media handler;
receiving acceptance from the audience member of one or more terms of the measurement rights agreement; and
storing the measurement rights agreement on the license server.

4. A method as defined in claim 3 wherein receiving the acceptance from the audience member comprises receiving a copy of the measurement rights agreement that has been electronically signed by the audience member.

5. A method as defined in claim 1 further comprising determining whether at least one of: (1) a time interval associated with renewal of the measurement rights agreement has expired, (2) an audience member associated with the measurement rights agreement has been removed from an audience measurement panel, (3) the digital rights manager has been altered, (4) the media handler has been altered, or (5) a media measurement entity is required to revoke the measurement rights agreement.

6. A method as defined in claim 1 further comprising disabling the media handler from obtaining the measurement information in response to determining that the measurement rights agreement has been revoked.

7. A method as defined in claim 1 further comprising:
determining whether an audience member has opted out of an audience measurement panel; and
disabling the media handler from obtaining the measurement information when the audience member has opted out of the audience measurement panel.

8. A method as defined in claim 1 further comprising initializing the media handler to disable obtaining of the measurement information during the media presentation.

9. A method as defined in claim 1 further comprising associating at least one of the digital rights manager or the media handler with a whitelist, wherein the whitelist includes at least one of: (1) a name associated with a media measurement entity, (2) a digital signature for authenticating the media measurement entity, or (3) an address of the license server.

10. A method as defined in claim 1 wherein automatically processing the measurement rights agreement further comprises:
determining whether the measurement rights agreement is authentic based on a digital signature of a media measurement entity associated with the measurement rights agreement; and
evaluating one or more rules included in the measurement rights agreement to determine any restrictions on the measurement information to be obtained by the media handler.

11. A method as defined in claim 10 further comprising disabling the media handler from obtaining the measurement information when the measurement rights agreement is not authentic.

12. A method as defined in claim 1 wherein the measurement rights agreement includes one or more rules indicating whether monitoring of media consumption is authorized and specifying any restrictions on the measurement information to be obtained by the media handler.

13. A method as defined in claim 12 wherein the one or more rules included in the measurement rights agreement are included based on a selection by an audience member associated with the media handler.

14. A method as defined in claim 1 wherein the measurement information obtained by the media handler comprises:
first measurement information obtained by capturing embedded information included in media processed by the media handler; and
second measurement information obtained by capturing user commands input to the media handler.

15. A machine readable storage device or storage disk comprising machine readable instructions which, when executed, cause a media device to at least:
determine whether a measurement rights agreement is stored locally in the media device;
when the measurement rights agreement is determined to not be stored locally, retrieve the measurement rights agreement from a license server separate from the media device;
make a first determination based on processing the measurement rights agreement, the first determination indicating whether the measurement rights agreement authorizes monitoring of a media presentation presented by a media handler;
make a second determination based on processing a license agreement separate from the measurement rights agreement, the second determination indicating whether the media handler is authorized to present the media presentation;
enable the media handler to obtain measurement information corresponding to the media presentation in response to the first determination indicating that monitoring of the media presentation is authorized; and
prevent the media handler from obtaining the measurement information corresponding to the media presentation, but not prevent the media handler from presenting the media presentation, in response to the first determination indicating that monitoring of the media presentation is not authorized.

16. A machine readable storage device or storage disk as defined in claim 15 wherein, to process the measurement rights agreement, the machine readable instructions cause the media device to:
determine whether the measurement rights agreement is authentic based on a digital signature of a media measurement entity associated with the measurement rights agreement; and
evaluate one or more rules included in the measurement rights agreement to determine any restrictions on the measurement information to be obtained by the media handler.

17. A machine readable storage device or storage disk as defined in claim 15 wherein the machine readable instructions, when executed, further cause the media device to initialize the media handler to disable obtaining of the measurement information during the media presentation.

18. A media processor comprising:
a media handler configurable to process media for presentation and to obtain measurement information corresponding to a media presentation presented by the media handler;

a digital rights manager implemented by a first programmed processor, the digital rights manager to:
    determine whether a measurement rights agreement is stored locally at the media processor;
    when the measurement rights agreement is determined to not be stored locally, retrieve the measurement rights agreement from a license server separate from the media processor;
    make a first determination based on processing the measurement rights agreement, the first determination indicating whether the measurement rights agreement authorizes monitoring of the media presentation;
    make a second determination based on processing a license agreement separate from the measurement rights agreement, the second determination indicating whether the media handler is authorized to present the media presentation;
    enable the media handler to obtain the measurement information in response to the first determination indicating that the measurement rights agreement authorizes monitoring of the media presentation; and
    prevent the media handler from obtaining the measurement information, but to not prevent the media handler from being configured to present the media presentation, in response to the first determination indicating that the measurement rights agreement does not authorize monitoring of the media presentation; and
a memory to store measurement information obtained by the media handler.

19. A media processor as defined in claim 18 further comprising a measurement rights agreement interpreter implemented by at least one of the first programmed processor or a second programmed processor to prepare the measurement rights agreement by exchanging data between an audience member associated with the media processor and a media measurement entity.

20. A media processor as defined in claim 18 wherein the digital rights manager comprises:
    a measurement rights agreement verifier to determine whether the measurement rights agreement is valid; and
    a measurement activator to process the measurement rights agreement and, in response to a determination by the measurement rights agreement verifier that the measurement rights agreement is valid, the measurement activator is to determine whether to at least one of: (1) configure the media handler to obtain the measurement information or (2) place a restriction on the measurement information to be obtained by the media handler.

21. A media processor as defined in claim 18 wherein the digital rights manager comprises a measurement rights agreement revoker to determine whether to revoke the measurement rights agreement.

22. A media processor as defined in claim 18 wherein the license server is located at a media measurement entity separate from an entity providing the media handler or media processed by the media handler.

23. A method to enable monitoring of media presented by a media handler, the method comprising:
    obtaining acceptance of a measurement rights agreement by an audience member associated with the media handler;
    storing an electronic version of the accepted measurement rights agreement at a license server;
    determining whether the accepted measurement rights agreement is stored locally in a media device;
    when the accepted measurement rights agreement is determined to not be stored locally, retrieving the accepted measurement rights agreement from the license server, the license server being separate from the media device; and
    processing (1) the accepted measurement rights agreement and (2) a license agreement separate from the accepted measurement rights agreement with a processor, the processing of the measurement rights agreement comprising making a first determination indicating whether the measurement rights agreement authorizes monitoring of a media presentation presented by the media handler, and the processing of the license agreement comprising making a second determination indicating whether the media handler is authorized to present the media presentation.

24. A method as defined in claim 23 further comprising presenting an interface for the audience member to select whether to at least one of modify or include a term in the measurement rights agreement prior to obtaining acceptance of the measurement rights agreement.

25. A method as defined in claim 23 wherein obtaining acceptance of the measurement rights agreement comprises receiving an electronic signature from the audience member.

* * * * *